United States Patent
Blackwelder et al.

(10) Patent No.: US 10,778,125 B2
(45) Date of Patent: Sep. 15, 2020

(54) SYNCHRONOUS ELECTRIC POWER DISTRIBUTION STARTUP SYSTEM

(71) Applicant: Rolls-Royce North American Technologies Inc., Indianapolis, IN (US)

(72) Inventors: Mark Jon Blackwelder, Plainfield, IN (US); Paul M. Rancuret, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 0 days.

(21) Appl. No.: 16/667,886

(22) Filed: Oct. 29, 2019

(65) Prior Publication Data
US 2020/0052627 A1 Feb. 13, 2020

Related U.S. Application Data

(63) Continuation of application No. 15/984,973, filed on May 21, 2018, now Pat. No. 10,476,418, which is a (Continued)

(51) Int. Cl.
*H02P 9/08* (2006.01)
*H02P 9/10* (2006.01)
(Continued)

(52) U.S. Cl.
CPC ............... *H02P 9/08* (2013.01); *H02P 1/54* (2013.01); *H02P 1/56* (2013.01); *H02P 5/74* (2013.01);
(Continued)

(58) Field of Classification Search
CPC ...... H02P 9/08; H02P 1/54; H02P 1/56; H02P 5/74; H02P 6/20; H02P 9/00; H02P 9/10
See application file for complete search history.

(56) References Cited

U.S. PATENT DOCUMENTS

| | | |
|---|---|---|
| 4,977,362 A | 12/1990 | Mäder |
| 5,053,635 A | 10/1991 | West |

(Continued)

FOREIGN PATENT DOCUMENTS

| | | |
|---|---|---|
| CN | 102148492 B | 8/2014 |
| GB | 871 188 A | 6/1961 |
| JP | 2004-015980 A | 1/2004 |

OTHER PUBLICATIONS

Miri, A. M., C. Sihier, and T. Zöller, "Active Damping of Torsional Modes in Turbine-Generator Shafts." 2009, pp. 1-6, *IEEE Power Electronics Specialists Conference (PESC)*. 2009.

(Continued)

*Primary Examiner* — Viet P Nguyen
(74) *Attorney, Agent, or Firm* — Brinks Gilson & Lione

(57) ABSTRACT

A system includes a synchronous generator coupled to an excitation system. The excitation system may output an excitation signal to excite the synchronous generator to produce a voltage and a current at an output of the synchronous generator. During startup, when the synchronous generator is rotating at less than rated speed, non-rotating synchronous electric motors may be electrically coupled to the synchronous generator. A controller may direct the excitation system to output the excitation signal to generate, with the synchronous generator, a first magnitude of current flow, and the synchronous motor loads are non-rotational in response to receipt of the first magnitude of current flow. In addition, the controller may selectively direct output of a pulse of the excitation signal, when the synchronous generator is rotating at less than rated speed, to urge the non-rotating synchronous motor loads into rotational electrical alignment with the synchronous generator and each other.

20 Claims, 10 Drawing Sheets

Related U.S. Application Data continuation of application No. 15/367,023, filed on Dec. 1, 2016, now Pat. No. 9,979,339.

(60) Provisional application No. 62/267,143, filed on Dec. 14, 2015, provisional application No. 62/369,191, filed on Jul. 31, 2016.

(51) Int. Cl.
| | | |
|---|---|---|
| *H02P 6/20* | (2016.01) | |
| *H02P 1/54* | (2006.01) | |
| *H02P 1/56* | (2006.01) | |
| *H02P 5/74* | (2006.01) | |
| *H02P 9/00* | (2006.01) | |

(52) U.S. Cl.
CPC .................. *H02P 6/20* (2013.01); *H02P 9/00* (2013.01); *H02P 9/10* (2013.01)

(56) References Cited

U.S. PATENT DOCUMENTS

| | | | |
|---|---|---|---|
| 5,780,997 A | 7/1998 | Sutrina et al. | |
| 5,998,880 A | 12/1999 | Kumar | |
| 6,140,803 A * | 10/2000 | Hurley | H02J 3/42 |
| | | | 307/87 |
| 6,239,513 B1 | 5/2001 | Dean et al. | |
| 6,784,634 B2 | 8/2004 | Sweo | |
| 6,850,043 B1 | 2/2005 | Maddali | |
| 7,116,073 B1 | 10/2006 | Sorkin | |
| 7,173,399 B2 | 2/2007 | Sihler et al. | |
| 7,242,105 B2 | 7/2007 | Mehl et al. | |
| 8,890,454 B2 | 11/2014 | De Franciscis | |
| 8,896,261 B2 | 11/2014 | Bando et al. | |
| 8,975,877 B2 | 3/2015 | Dooley | |
| 9,979,339 B2 * | 5/2018 | Blackwelder | H02P 9/08 |
| 10,141,874 B2 * | 11/2018 | Blackwelder | H02P 9/08 |
| 10,476,418 B2 * | 11/2019 | Blackwelder | H02P 6/20 |
| 2004/0108726 A1 | 6/2004 | Sarlioglu et al. | |
| 2004/0263131 A1 | 12/2004 | Suelzle et al. | |
| 2005/0116689 A1 * | 6/2005 | Fogarty | H02P 9/04 |
| | | | 322/29 |
| 2006/0192535 A1 | 8/2006 | Lando | |
| 2006/0232250 A1 | 10/2006 | Sihler et al. | |
| 2008/0191483 A1 | 8/2008 | Takeuchi | |
| 2008/0315822 A1 * | 12/2008 | Maddali | H02P 6/18 |
| | | | 318/700 |
| 2009/0167231 A1 | 7/2009 | Sussmeier | |
| 2010/0019707 A1 | 1/2010 | Dooley | |
| 2010/0052626 A1 | 3/2010 | Tupper et al. | |
| 2011/0109085 A1 | 5/2011 | Nelson | |
| 2011/0254368 A1 | 10/2011 | Boe | |
| 2012/0062161 A1 | 3/2012 | Patel et al. | |
| 2012/0098261 A1 * | 4/2012 | Rozman | F02N 11/006 |
| | | | 290/31 |
| 2012/0187923 A1 | 7/2012 | Lehmann | |
| 2012/0306458 A1 | 12/2012 | Fogarty | |
| 2012/0313372 A1 * | 12/2012 | Bjerknes | F01D 15/10 |
| | | | 290/34 |
| 2013/0119769 A1 | 5/2013 | Johnson et al. | |
| 2013/0175871 A1 | 7/2013 | Knüppel et al. | |
| 2013/0193888 A1 | 8/2013 | Markunas | |
| 2014/0015457 A1 | 1/2014 | Kwon et al. | |
| 2014/0049229 A1 | 2/2014 | Li et al. | |
| 2014/0266076 A1 | 9/2014 | Rozman et al. | |
| 2014/0285161 A1 | 9/2014 | Bernard et al. | |
| 2015/0048806 A1 | 2/2015 | Deak | |
| 2016/0149528 A1 | 5/2016 | Frampton et al. | |
| 2016/0149529 A1 | 5/2016 | Seidl | |
| 2016/0380567 A1 | 12/2016 | Grafling et al. | |
| 2017/0170761 A1 | 6/2017 | Blackwelder et al. | |
| 2017/0170762 A1 | 6/2017 | Blackwelder et al. | |
| 2017/0170763 A1 | 6/2017 | Blackwelder et al. | |
| 2017/0170764 A1 | 6/2017 | Blackwelder et al. | |
| 2017/0170765 A1 | 6/2017 | Blackwelder et al. | |
| 2017/0237373 A1 * | 8/2017 | Tabuchi | H02P 9/302 |
| | | | 322/79 |
| 2019/0074786 A1 * | 3/2019 | Blackwelder | H02P 25/03 |
| 2019/0158003 A1 | 5/2019 | Atmur | |
| 2020/0047897 A1 * | 2/2020 | Armstrong | B60L 50/10 |

OTHER PUBLICATIONS

International Search Report, PCT Application No. PCT/US2016/066422, pp. 1-23, dated May 3, 2017, European Patent Office, Rijswijk, The Netherlands.

Extended European Search Report, European Application No. 16203399.7, pp. 1-10, dated Aug. 17, 2017, European Patent Office, Munich, Germany.

European Office Action, dated Mar. 13, 2019, pp. 1-8, issued in European Patent Application No. 16 203 399.7, European Patent Office, Munich, Germany.

* cited by examiner

SYNCHRONOUS ELECTRIC POWER DISTRIBUTION STARTUP SYSTEM

CROSS-REFERENCE TO RELATED APPLICATIONS

This application is a continuation of U.S. patent application Ser. No. 15/984,973, "SYNCHRONOUS ELECTRICAL POWER DISTRIBUTION SYSTEM STARTUP" filed May 21, 2018, which is a continuation of U.S. patent application Ser. No. 15/367,023, "SYNCHRONOUS ELECTRICAL POWER DISTRIBUTION SYSTEM STARTUP" filed Dec. 1, 2016, which claims priority under 35 USC § 119(e) to U.S. provisional application 62/267,143, "SYNCHRONOUS ELECTRICAL POWER DISTRIBUTION SYSTEM STARTUP AND CONTROL" filed Dec. 14, 2015, and which also claims priority under 35 USC § 119(e) to U.S. provisional application 62/369,191, "SYNCHRONOUS ELECTRIC POWER DISTRIBUTION SYSTEM STARTUP" filed Jul. 31, 2016, all of which are incorporated herein by reference.

TECHNICAL FIELD

This disclosure relates to synchronous alternating current systems and, in particular, to synchronous generators.

BACKGROUND

Synchronous power systems are commonly used for efficiently powering electrical motors that drive fans, compressors, pumps, and other types of loads. Asynchronous electrical machines produce (e.g., motors) or consume (e.g., generators) torque only in conditions where the mechanical speed is different than the electrical speed. The magnitude of the difference of mechanical and electrical speeds is commonly referred to as "slip". Asynchronous motors produce at least partial, and up to full rated, torque at all mechanical speeds less than the electrical voltage speeds, thus allowing acceleration rapidly to near matching electrical and mechanical speeds when connected to an electrical bus operating at constant speed, or "line start". The ratio of electrical speed with respect to mechanical speed of an electrical machine is defined by the number of magnetic pole pairs of the specific design. Examples of asynchronous motors are induction motors which function based on Eddy current phenomena and hysteresis motors which rely on magnetic hysteresis phenomena. Induction motors are commonly used to drive mechanical loads from fixed speed national electric grids due to their "line start" capacity.

Synchronous electrical machines produce (e.g., motors) or consume (e.g., generators) torque only in conditions where the mechanical speed is equal to the electrical speed and the rotor and stator magnetic poles are misaligned. Synchronous machines commonly cannot "line start" due to the impractical requirement to connect the nonrotating motor to the rotating electrical grid at precisely aligned stator and rotor magnetic poles and develop sufficient torque to accelerate the rotor to electrical speed before misalignment exceeds ninety degrees electrical, where accelerating torque decreases and becomes negative at one hundred eighty degrees electrical. Synchronous machines are uncommon for driving mechanical loads from fixed speed national electrical grids due to the need to add "line start" functionality. A synchronous generator may provide such a system with the electrical power needed to spin the electrical motors that drive the loads. In some systems, the generator and load driving motors may be accelerated to operating speed using power electronics, a pony motor, and/or extra induction rotor devices; all of which may increase losses (thereby decreasing efficiency) and add mass to the system.

SUMMARY

In one example, the disclosure is directed to a system that includes a excitation system configured to output a variable excitation signal, and a synchronous generator configured to generate power for a plurality of rotational synchronous motor loads based on the variable excitation signal. The excitation system may output the variable excitation signal based on a voltage and current being supplied by the generator to the rotational synchronous motor loads. In addition, the excitation system may, in response to the rotational synchronous motor loads not rotating, provide pulses of the excitation signal in at least one of a first stage or a second stage. The excitation system may selectively provide pulses of the variable excitation signal in the first stage to temporarily energize the rotational synchronous motor loads prior to rotation of the generator, and the excitation system selectively provide pulses of the variable excitation signal in the second stage after rotation of the generator commences. The pulses of the variable excitation at the second stage may be provided to coincide with the generator and the rotational synchronous motor loads being substantially in electrical alignment.

In another example, the disclosure is directed to a system that includes a excitation system configured to output a variable excitation signal, and a synchronous generator configured to generate output power for a plurality of rotational synchronous motor loads in response to receipt of the variable excitation signal. The excitation system may output a pulse of the variable excitation signal to the generator to urge the plurality of rotational synchronous motor loads into rotational electrical alignment with the synchronous generator based on a corresponding pulse of output power generated by the synchronous generator in response to receipt of the pulse of the variable excitation signal.

In yet another example, the disclosure is directed to a system that includes an excitation system configured to output a variable excitation signal, and a synchronous generator configured to generate power for a plurality of rotational synchronous motor loads based on the variable excitation signal. The excitation system may output the variable excitation signal based on a voltage and current being supplied to the rotational synchronous motor loads. The excitation system may also, in response to absence of rotation of at least some of the rotational synchronous motor loads, selectively provide pulses of the variable excitation signal in at least one of a first stage prior to rotation of the generator to temporarily energize the rotational synchronous motor loads, or a second stage after rotation of the generator commences. The pulses of the variable excitation signal at the second stage may be provided at times when a rotor of the generator and a rotor of the rotational synchronous motor loads are substantially aligned.

The details of one or more examples are set forth in the accompanying drawings and the description below. Other features, objects, and advantages of the disclosure will be apparent from the description and drawings, and from the claims.

DETAILED DESCRIPTION

The techniques and circuits described in this disclosure may enable a controller of an example synchronous power system to synchronize a generator to one or more load driving motors by carefully controlling the field current of an exciter to the generator and rotational acceleration or speed of the prime mover shaft. As such, the example synchronous power system may perform generator to load-motor synchronization without suffering from an increase in mass or decrease in efficiency that is commonly caused by power electronics, pony motors, and induction rotor devices which are typically used to synchronize other power systems.

Figure 1:
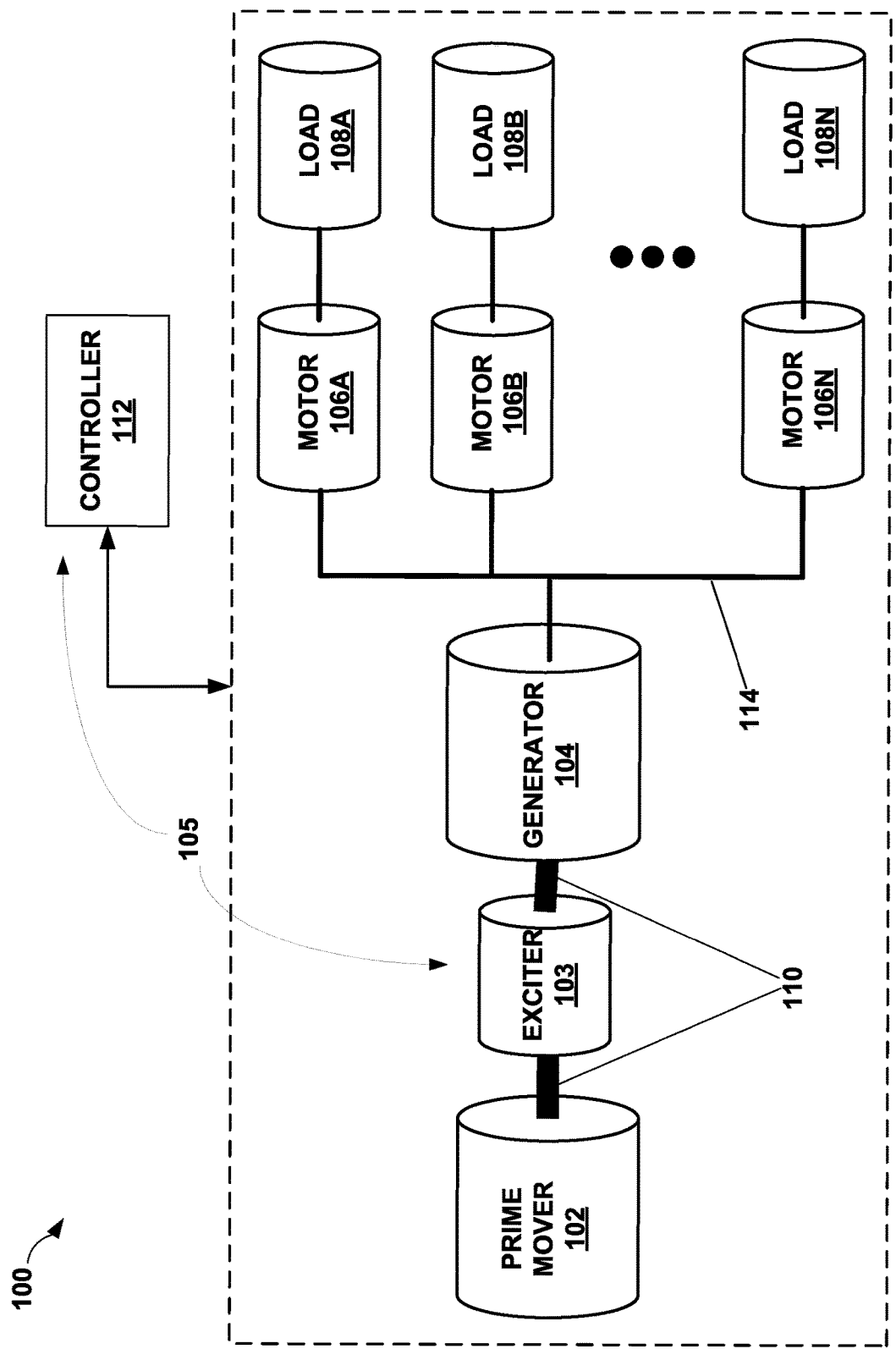
FIG. 1 is a conceptual diagram illustrating an example synchronous power system for providing electrical power from an alternating current generator to one or more motors, in accordance with one or more aspects of the present disclosure.

FIG. 1 is a conceptual diagram illustrating system 100 as an example synchronous power system for providing poly-phase electrical power from at least one alternating current generator to one or more motors, in accordance with one or more aspects of the present disclosure. The polyphase electrical power may be balanced polyphase electrical power, such as three phase or six phase balanced electrical power. System 100 includes prime mover 102, exciter 103, generator 104, motors 106A-106N (collectively referred to as "motors 106), and loads 108A-108N (collectively referred to as "loads 108"). System 100 also includes controller 112 for controlling each of components 102, 103, 104, 106, and 108.

Prime mover 102 is configured to provide mechanical energy to system 100 by rotating or spinning shaft 110.

Prime mover 102 is any type of machine, whether an engine or a motor, that is configured to produce mechanical energy for use in a synchronous power system. Examples of prime mover 102 include heat engines (e.g., internal or external combustion engines), electrical motors, pneumatic motors, hydraulic motors, jet engines, or any other type of machine that can be controlled so as to vary the rotational speed or acceleration of shaft 110. In some examples, the acceleration or speed of prime mover 102 can be finely controlled during start-up. For example, prime mover 102 may be controllable so that the speed of prime mover 102 increases during a first phase of a start-up period (e.g., one to two seconds, up to about thirty seconds), from substantially zero to one percent of its operational speed. Once prime mover 102 reaches one percent of its operational speed, prime mover 102 may be controllable so that the speed of prime mover 102 increases much more quickly during a second phase of the start-up period (e.g., thirty to fifty seconds), from one percent to eighty or one hundred percent of its operational speed.

Exciter 103 and generator 104, in combination, convert the mechanical energy provided by prime mover 102 into a suitable form of electrical energy for powering and spinning motors 106 to drive loads 108. Alternatively, exciter 103 and generator 104 may be on separate shafts, or exciter 103 may not be a shaft driven device. The controller 112 and the exciter 103 may cooperatively operate as an excitation system 105 to provide or otherwise output a variable excitation signal. The excitation signal may be, for example, a field current $I_{FIELD}$ (also referred to as a "magnetizing current") to generator 104. In this example, generator 104 uses the field current $I_{FIELD}$ to magnetize the electromagnets in its rotor such that when the rotor spins with shaft 110, generator 104 produces an alternating current at electrical bus 114. Exciter 103 may produce the field current $I_{FIELD}$ by producing an electromotive force (EMF) which induces an alternating (AC) current, and then by rectifying the AC current, exciter 103 outputs the field current $I_{FIELD}$ in a direct (DC) current form.

In the example of FIG. 1, generator 104 is an AC generator. In some examples, generator 104 is configured to output variable frequency, three-phase AC power onto bus 114. In other examples, generator 104 may output any poly-phase (e.g., two or more phase) AC power onto a single bus such as bus 114 or multiple buses. In the example of FIG. 1, exciter 103 is a brushless field exciter (e.g., a rotating-rectifier exciter). Exciter 103 may be any type of exciter that can produce a controllable excitation signal, such as field current $I_{FIELD}$. The terms excitation signal and field current $I_{FIELD}$, are used interchangeably herein, however, the excitation signal may be any other form of variable signal capable of causing a generator to output a variable voltage and current to supply variable power to a load. Thus, it is to be understood that the description of the output of the exciter or excitation system as a field current does not limit the operation of the generator or the output of the exciter or the excitation system to only a field current.

Motors 106 represent any type of synchronous, asynchronous, or hybrid combination thereof, motor for receiving AC electrical power provided by a synchronous power system, such as system 100. In the example of FIG. 1, motors 106, such as synchronous motors, are electrically coupled to generator 104 via bus 114. For example, motors 106 may be propulsion motors for an aircraft or marine craft, for example, for driving propellers. Motors 106 may include additional sensors and/or feedback circuitry for providing information (e.g., voltage, current, speed, frequency, phased, etc.) back to the components of system 100 that are used to control motors 106, such as controller 112.

Loads 108 represent any type of motor-driven load. In the example of FIG. 1, loads 108 are mechanically coupled to motors 106, such as synchronous motors to form rotational synchronous motor loads. Examples of loads 108 include propellers, fans, compressors, pumps, screws, or any other type of load that is driven by an electrical motor, such as one of motors 106, and do not exhibit zero speed or static torque. Thus, the loads 108 may exhibit a linear increase in counter torque as the rotational speed of individual loads 108 increases with a corresponding increase in the speed of a motor 106. The loads may be non-linear loads having torque that is monotonic to speed so that as speed increases, torque increases. In other words, torque may be continuous through a range of speed such that the motors may have a uniformly smooth torque curve.

System 100 includes controller 112, which is configured to synchronize generator 104 to the motors 106 by operation in the excitation system 105 to control a level of the excitation signal, or field current $I_{FIELD}$, being output from exciter 103 based on a speed of shaft 110. For the sake of brevity and clarity, controller 112 is shown as, generally, being operatively coupled to any or all of components 102, 103, 104, 106, and 108, 110, and 114. In other words, controller 112 is configured to provide signals and information to, and receive information from (e.g., as feedback), each of the different components of system 100. For example, controller 112 may send information to prime mover 102 to vary the acceleration or speed of shaft 110. As another example, during operation as part of the excitation system 105, the controller 112 may send information to exciter 103 so the excitation system 105 may vary or otherwise control the variable excitation signal in the form of the field current $I_{FIELD}$ provided to generator 104.

Controller 112 may comprise any suitable arrangement of hardware that may include software or firmware configured to perform the techniques attributed to controller 112 that are described herein. Examples of controller 112 include any one or more computing systems, computing devices, microprocessors, digital signal processors (DSPs), application specific integrated circuits (ASICs), field programmable gate arrays (FPGAs), or any other equivalent integrated or discrete logic circuitry, as well as any combinations of such components. Thus, there may be any number of independently operating controllers 112 in the system 100 that may or may not be in direct communication with each other. Controller 112 that includes software or firmware also includes hardware, such as one or more processors, processing units, processing components, or processing devices, for storing and executing the software or firmware contained therein.

In general, a processor, processing unit, processing component, or processing device is a hardware device that may include one or more microprocessors, DSPs, ASICs, FPGAs, or any other equivalent integrated or discrete logic circuitry, as well as any combinations of such components. Although not shown in FIG. 1, controller 112 may include a memory configured to store data. The memory may be any form of storage medium that is other than transitory, and may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 112 (e.g., may be external to a package in which controller 112 is housed) and may include or comprise any suitable storage medium, such as a non-transitory storage medium, for storing instructions that can be retrieved and executed by a processor of controller 112.

In some examples, controller 112, or any portion thereof, may be an internal component or feature of any of components 102, 103, 104, 106, or 108. In other words, any one or more of components 102, 103, 104, 106, or 108 may include controller 112, or any feature or characteristic associated with controller 112 that is described herein, as an internal component.

In operation, controller 112 may provide a signal or command (directly or indirectly) to prime mover 102 that causes shaft 110 to begin spinning with a particular rotational speed or acceleration in accordance with the signal or command provided by controller 112. During operation within the excitation system 105, the controller 112 may provide an additional signal or command to exciter 103 that causes exciter 103 to produce a particular field current $I_{FIELD}$, or excitation signal, based at least partially on the signal or command from controller 112. The excitation signal and speed with which shaft 110 spins may cause generator 104 to output a two or more phase AC electrical signal across electrical bus 114. Motors 106 may be energized by the AC electrical signal received via bus 114 to drive loads 108.

By providing signals and/or commands to prime mover 102, exciter 103, and generator 104, controller 112 may synchronize generator 104 to motors 106 by carefully controlling the field current $I_{FIELD}$ exciter 103 provides to generator 104 and by also carefully controlling the acceleration or speed of shaft 110. As such, controller 112 may alone perform generator to load-motor synchronization. Accordingly, system 100 may not suffer from an increase in mass or decrease in efficiency that is commonly caused by power electronics, pony motors, and induction rotor devices which are typically used to synchronize generators to motors of other power systems.

Figure 2:
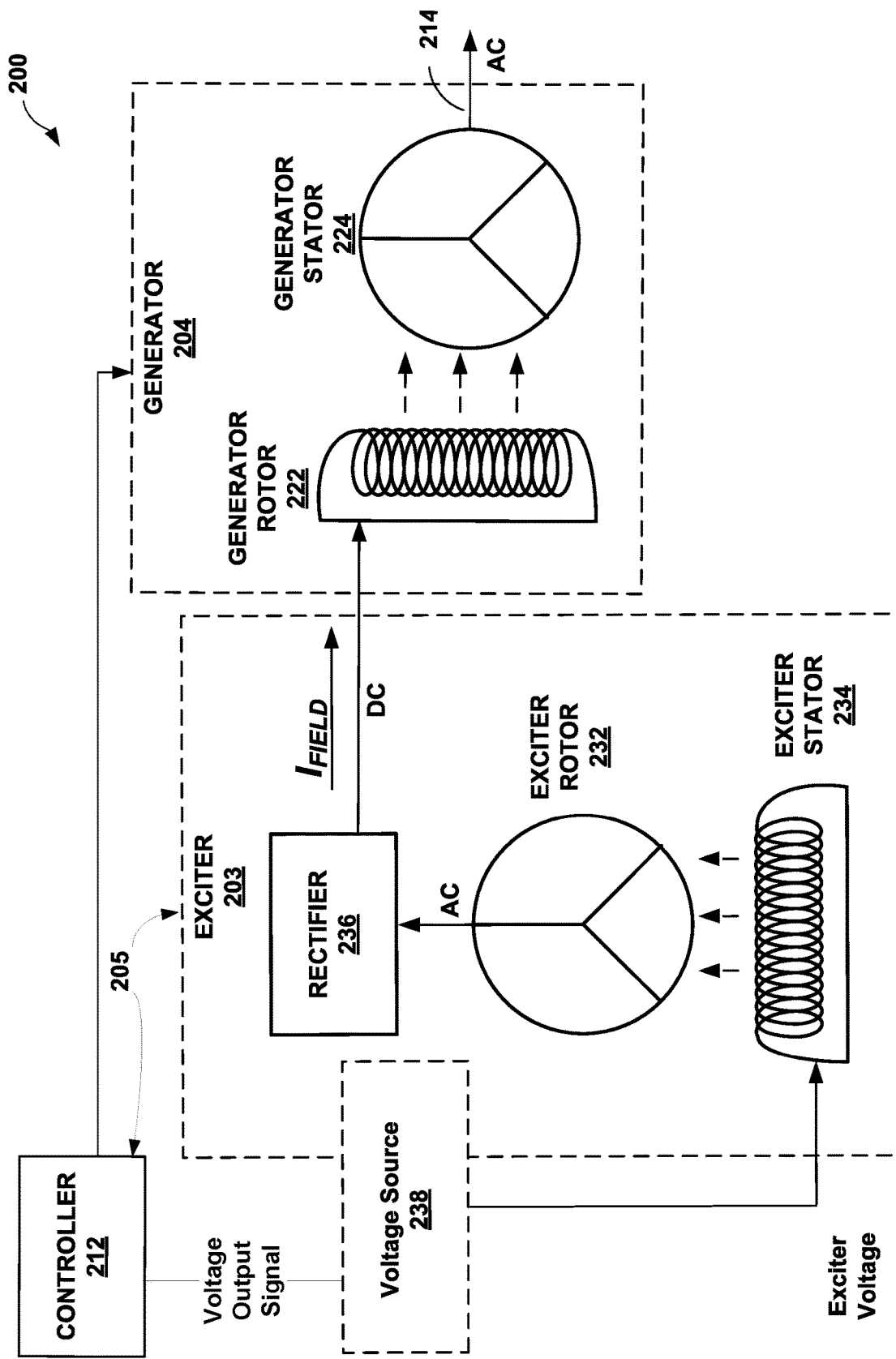
FIG. 2 is a schematic diagram illustrating a portion of an example synchronous power system for providing electrical power from an alternating current generator to one or more motors, in accordance with one or more aspects of the present disclosure.

FIG. 2 is a schematic diagram illustrating system 200 as a portion of an example generator of an example synchronous power system, such as system 100 of FIG. 1, for providing polyphase electrical power from an alternating current generator, such as a synchronous generator, to one or more motors, such as synchronous motors, in accordance with one or more aspects of the present disclosure. For the sake of brevity and ease of description, system 200 is described within the context of FIG. 1. For example, exciter 203 and generator 204 of system 200 represent examples of, respectively, exciter 103 and generator 104 of system 100. Exciter 203 and generator 204 are controllable by controller 212 of system 200 which represents an example of controller 112 of system 100, and excitation system 205 represents an example similar to excitation system 105.

Exciter 203 represents an example of a brushless exciter and is configured to output an excitation signal, such as field current $I_{FIELD}$ to generator 204. Exciter 203 is controllable by controller 212 such that signals or commands from controller 212 in the form of a voltage output signal (exciter voltage) cause exciter 203 to output a variable level excitation signal, such as a variable field current $I_{FIELD}$. In other words, the excitation system 205 outputs a variable excitation signal, and the generator 204 generates power for the motors based on the variable excitation signal. Exciter 203 includes exciter rotor 232, exciter stator 234, and rectifier 236. Exciter 203 may include other components required to produce the variable excitation signal.

In the example of FIG. 2, generator 204 may include field coils in which the excitation signal in the form of field current $I_{FIELD}$ flows. Rectifier 236 rectifies an AC current output from exciter rotor 232 to a DC field current $I_{FIELD}$ output that is used by generator 204 to magnetize generator rotor 222. In some examples, rectifier 236 is a full-bridge rectifier.

Exciter stator 234 may include an exciter field coil, which is a set of stationary coils. In other words, the exciter field coil does not move or spin with movement of a prime mover shaft. Exciter stator 234 may be energized, by controller 112 using a controlled variable voltage source 238, to induce a current in the exciter stator 234. The voltage source 238 may supply the exciter voltage. As described later, the voltage source 238 may transition the exciter voltage between AC voltage and DC voltage such that an AC current, a DC current or some combination of an AC current waveform and a DC current waveform may be induced with the exciter stator 234. Accordingly, the exciter voltage may selectively include an AC component and a DC component. The level of the AC component and the DC component in the exciter voltage may be selectively and/or independently varied by the controller based on a rotational speed of the exciter rotor 232. Controller 112 may control the voltage level of the voltage source 238 (exciter voltage) via the voltage output signal to vary the level of the DC current that is induced by exciter stator 234. The voltage source 238 is illustrated with dotted lines since the voltage source 238 may be included in the controller 212, and may be controlled using a voltage regulation circuit or through other voltage regulation techniques. Alternatively, the voltage source 238 may be a separate device or system that receives the voltage output signal from the controller 212 and produces the exciter voltage, or may be included in the exciter 203 and receives the voltage output signal. For purposes of brevity, the exciter voltage will be described as being controlled by the controller 212 using a voltage output signal, although it should be recognized that the controller 212 may provide the exciter voltage or control output of the exciter voltage.

Exciter rotor 232 may include an exciter armature, which is a set of balanced coils, coupled to shaft 110 (not shown) of system 100, which is driven by prime mover 102 of system 100, and controlled by controller 212 to spin at a variable speed or acceleration. In other words, unlike the exciter field coil which may remain stationary, the exciter armature may move or spin with movement of a prime mover shaft. The balanced coils of exciter rotor 232 are connected through rectifier 236 to generator rotor 222. When the exciter armature of exciter rotor 232 is rotating or spinning, the magnetic flux produced by the exciter field coil of exciter stator 234 is provided by the exciter armature coils of exciter rotor 232 to rectifier 236. This change in magnetic flux in the exciter armature coils of exciter rotor 232 generates an electromotive force (EMF). This EMF induces current in the field winding of generator rotor 222 during a first portion of the EMF AC cycle. The flux produced by the exciter armature coil of exciter rotor 232 then decreases as it leaves the magnetic flux region of exciter field coil of exciter stator 234, and an opposite EMF is generated. Rectifier 236 naturally applies the EMF in a consistent manner to induce current flow in one direction, as field current $I_{FIELD}$, through the field coil of generator rotor 222.

Generator 204 is configured to output an AC power to electrical bus 214. Generator 204 is controllable by controller 212 such that a signal and/or command (voltage output signal) from controller 212 controls the exciter voltage, which may cause generator 204 to output AC power at a variable power level or variable frequency at bus 214. Generator 204 includes generator rotor 222 and generator stator 224.

Generator rotor 222 may include a rotating field coil that spins or rotates with shaft 110 of system 100 congruently with the spinning or rotation of exciter rotor 232. The field coil of generator rotor 222 is typically much more inductive than the rotor coils of exciter rotor 232, and as such, the field coil of generator rotor 222 may filter the fundamental frequency of field current $I_{FIELD}$ (i.e., the rectified exciter current). Field current $I_{FIELD}$ from exciter 203 magnetizes generator rotor 222.

Generator stator 224 includes a set of stationary coils which may not move or spin with movement of shaft 110. As generator rotor 222 spins with the spinning of shaft 110, the resultant magnetic field produced by field current $I_{FIELD}$ running through the rotating field coil of generator rotor 222 induces an AC current out of generator stator 224 at bus 214.

Figure 3:
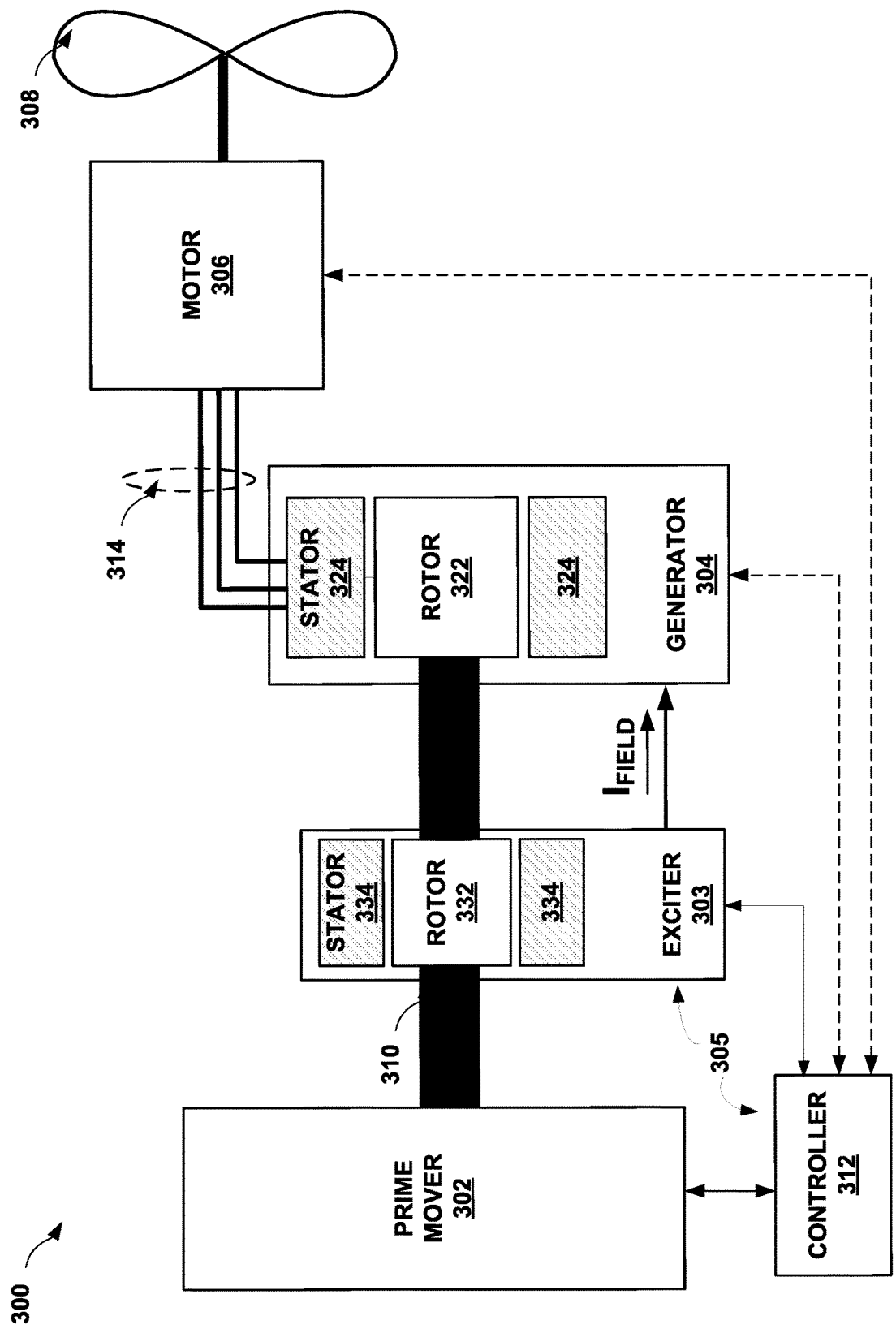
FIG. 3 is a conceptual diagram illustrating a portion of an example synchronous power system for providing electrical power from an alternating current generator to one or more motors, in accordance with one or more aspects of the present disclosure.

FIG. 3 is a conceptual diagram illustrating system 300 as a portion of an example synchronous power system, such as system 100 of FIG. 1, for providing polyphase electrical power from an alternating current generator, such as a synchronous generator, to one or more motors, such as synchronous motors, in accordance with one or more aspects of the present disclosure. For the sake of brevity and ease of description, system 300 is described within the context of system 100 of FIG. 1 and system 200 of FIG. 2. For example, exciter 303 and generator 304 of system 300 represent examples similar to, respectively, exciter 103 and generator 104 of system 100 or exciter 203 and generator 204 of system 200. Exciter 303 and generator 304 are controllable by controller 312 of system 300 which represents an example similar to the controllers 112 and 212 of systems 100 and 200, and excitation system 305 represents an example similar to excitation systems 105 and 205.

System 300 includes prime mover 302 as an example of prime mover 102 of system 100. Prime mover 302 produces mechanical energy that spins shaft 310 which causes rotor 332 of exciter 303 and rotor 322 of generator 304 to also spin or rotate as exciter 303 and generator 304 may be both mechanically coupled to shaft 310. In other words, rotor 332 and rotor 322 may be mechanically coupled to prime mover 302 via shaft 310. In other examples, exciter 303 and generator 304 may be on separate shafts, or exciter 303 may not be a shaft driven device.

System 300 further includes motor 306 and load 308. Motor 306 may be driven by a three-phase AC electrical signal output from generator 304 onto link 314. In the example of system 300, motor 306 is a synchronous propulsor motor which is mechanically coupled to load 308. In the example of FIG. 3, load 308 is a fan or a propeller, or another load having a linear torque curve. In other examples, system 300 may include more than one motor 306 and more than one load 308, including any and all other examples of motors 106 and loads 108 described above with respect to system 100.

Controller 312 of system 300 may send and receive information for controlling the speed at which shaft 310 spins, the current or voltage level at bus 314, and/or the speed at which motor 306 spins load 308. For example, controller 112 may provide a signal or command to prime mover 302 that causes prime mover 302 to spin shaft 310 with a particular speed or acceleration defined by the signal from controller 312. Controller 312 may also operate within the excitation system 305 to provide a signal or command (voltage output signal) to exciter 303 that causes exciter 303 to output a variable excitation signal such as a particular field current $I_{FIELD}$ in accordance with the signal or command from controller 312 that provides the exciter voltage. The field current $I_{FIELD}$ produced by exciter 303 and the speed with which shaft 310 spins may cause generator 304 to output a three-phase AC electrical signal across electrical bus 314. Motor 306 may use the AC electrical signal received via bus 314 to drive load 308. Thus, the generator 304 may generate variable power for the motors 306 based on a variable excitation signal output by the excitation system 305.

Figure 4:
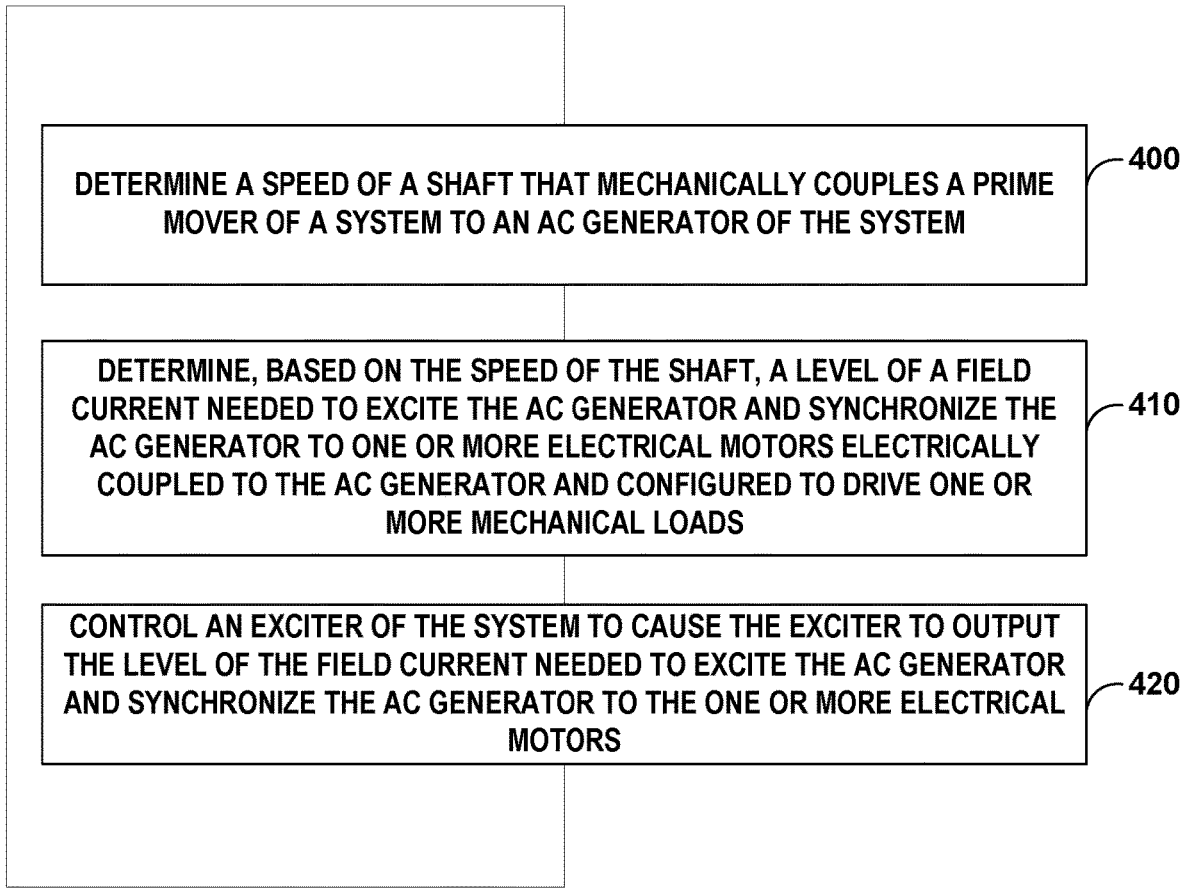
FIG. 4 is a flow chart illustrating example operations performed by a controller of an example synchronous power system for providing electrical power from an alternating current generator to one or more motors, in accordance with one or more aspects of the present disclosure.

FIG. 4 is a flow chart illustrating example operations performed by a controller of an example synchronous power system, such as system 100 of FIG. 1, for providing polyphase electrical power from an alternating current generator to one or more motors, in accordance with one or more aspects of the present disclosure. FIG. 4 is described below within the context of FIGS. 1-3. For the sake of brevity, operations 400-420 are described as being performed by controller 112 of FIG. 1 although controllers 212 and 312 may also perform operations 400-420.

Controller 112 may synchronize generator 104 to motors 106 by providing signals and commands, to prime mover 102, exciter 103, and generator 104, that carefully control the excitation signal, such as the field current $I_{FIELD}$ exciter 103 provides to generator 104, and by also carefully controlling the rotational acceleration or speed of shaft 110. In other words, since controller 112 has control with respect to the start of prime mover 102 and its acceleration of shaft 110, and since controller 112 has control with respect to the excitation signal, such as the field current $I_{FIELD}$, provided to generator 104, and since system 100 powers loads 108 that have a torque that increases linearly in dependence on rotational speed, then controller 112 may control system 100 through means already designed into the downstream system. As such, controller 112 may alone perform generator to load-motor synchronization without the need for additional power electronics, pony motors, and induction rotor devices that are typically used to synchronize generators to motors of other power systems.

To implement the control concept provided by controller 112, motors 106 and generator 104 may be well matched and controller 102 may control the excitation signal, such as the field current $I_{FIELD}$ provided by exciter 103, to enable rotor magnetic flux at generator 104 even when shaft 110 is at substantially zero speed. In other words, with motors 106 and generator 104 being matched, the combined electrical ratings of motors 106 are within the operating capacity of generator 104, and generator 104 has sufficient capacity to produce excess (e.g., 125%) of the combined voltages required by motors 106 for short periods (e.g., 5 seconds). Substantially zero speed of the shaft 110 refers to the lowest speed in which the generator 104 can source sufficient terminal current to supply the very small static friction torque, negligible load torque, and torque to accelerate the moment of inertia of the motors 106 to the same electrical speed before the generator 104 rotates more than about ¼ of an electrical revolution. By controlling the speed of shaft 110 and the energizing voltage (voltage output signal) provided to exciter 103, controller 112 may be able to control the "synchronization" of motors 106 and loads 108 without additional power electronics, pony motors, and induction rotor devices. Synchronization may be controlled since when prime mover 102 and generator 104 start (e.g., as shaft 110 first begins to rotate and starts to increase from a zero speed to an operational speed over a period of time ranging from seconds to minutes) the load torques associated with corresponding motors 106 and loads 108, which are of negligible magnitude at low speeds, correspondingly increase as speed increases. Controller 112 may control system 100 based on the following theory of operations.

For controller 112 to induce a terminal voltage ($V_{GEN}$) of generator 104 (e.g., a voltage sufficient to initiate rotation of motor 106 and loads 108), during system start-up and at extremely low rotational rotor speeds ($\omega$) of generator 104, controller 112 may energize the field coil of the stator of exciter 103 to induce a voltage with a significantly high magnitude and frequency. That is, the voltage used to energize the field coil of the stator of exciter 103 may have a combination of magnitude and frequency that causes the magnetic flux produced by the stator of exciter 103 to couple across the exciter air-gap between the stator and rotor, so as to produce an excitation signal, such as a field current $I_{FIELD}$ from the rotor of exciter 103, that is sufficient for initiating and maintaining rotation of the motors 106, without exceeding the voltage rating of the exciter stator insulation. Thus, the excitation signal, such as field current $I_{FIELD}$, is capable of producing the maximum generator phase voltage at whatever rated speed the generator 104 is rotating. For example, consider Table 1, which shows variation in field current $I_{FIELD}$ and terminal voltage $V_{GEN}$ given variations in rotor speeds ($\omega$) and the magnitude of the exciter voltage at exciter 103. Note: The values shown in Table 1 are examples only for the purposes of illustration; actual values vary depending on system parameters and load requirements.

TABLE 1

| Exciter Voltage (V) | Exciter Frequency (Hz) | Field Current - $I_{FIELD}$ (A) | Rotor Speed -$\omega$ (RPM) | Terminal Voltage - $V_{GEN}$ @ rated speed (V) |
| --- | --- | --- | --- | --- |
| 6 V | 0 | ~0 | 1 | ~0 |
| 260 V | 200 | 13 | 1 | ~0.19 |
| 200 V | 200 | 10 | 1000 | 145.5 |
| 6 V | 0 | 10 | 1000 | 145.5 |
| 200 V | 200 | 10 | 3300 (rated) | 480 |
| 2 V | 0 | 3.3 | 10000 | 480 |

According to Table 1, with an exciter voltage of 6V, 0 Hz (AC waveform), when a rotor speed ($\omega$) of generator 104 is substantially zero (or low), the field current $I_{FIELD}$ out of exciter 103 may be only 0.7 A (max), which may not be sufficient to produce a terminal voltage $V_{GEN}$ at generator 104 (e.g., which is not of sufficient magnitude to drive motors 106). On the other hand, at an exciter voltage of 260V, 200 Hz, when the rotor speed ($\omega$) of generator 104 is substantially zero (or low), the field current $I_{FIELD}$ out of exciter 103 may be 10 A and may be sufficient to produce a terminal voltage $V_{GEN}$ of generator 104 that is approximately 0.19V (e.g., which produce sufficient current magnitude to drive motors 106 up to the low synchronous speed).

As the rotor speed ($\omega$) increases, the required magnitude of the exciter voltage becomes less and less, to produce a sufficient field current $I_{FIELD}$ out of exciter 103 that is sufficient to produce a terminal voltage $V_{GEN}$ of generator 104 sufficient to drive motors 106. For example, at an exciter voltage of only 200V, 200 Hz, when the rotor speed ($\omega$) of generator 104 is approximately ⅓ the operational speed (e.g., 1000 RPM), the field current $I_{FIELD}$ out of exciter 103 may still be 10 A and may be sufficient to produce a terminal voltage $V_{GEN}$ of generator 104 that is approximately 145.5V (e.g., which may be of sufficient magnitude to drive motors 106).

Lastly, Table 1 shows that when the rotor speed (ω) of generator 104 is relatively high (e.g., at 1000 RPM or some other operational speed), an exciter voltage of only 6V, 0 Hz (DC waveform) may produce a field current $I_{FIELD}$ out of exciter 103 of 10 A which may be sufficient to produce a terminal voltage $V_{GEN}$ of generator 104 that is also approximately 145.5V. In other words, Table 1 shows that, when the exciter voltage of exciter 103 is increased to a relatively high frequency (e.g. 200 Hz), by increasing the magnitude of the exciter voltage to sufficiently high levels (e.g., 200V), exciter 103 may produce a field current $I_{FIELD}$ that is sufficiently high (e.g., 10 A), even near substantially zero or low speed (ω), to produce a terminal voltage $V_{GEN}$ that is sufficient for driving motors 106 to begin and maintain rotation. As the rotor speed (ω) of the generator 104 increases beyond a threshold speed (e.g., ⅓ operational or ⅓ max speed), the magnitude of the exciter voltage can be reduced and still cause exciter 103 to produce a sufficiently high field current $T_{FIELD}$ to drive the motors 106. When the rotor speed (ω) reaches a predetermined rotation speed, such as an operational speed or a maximum speed, the AC component of the exciter voltage can be removed entirely and the exciter voltage can be a nominal DC voltage (e.g., 6V, 0 Hz). See FIG. 5 for a graphical view of the relationship between exciter voltage and rotor speed (ω).

The above theory of operations may enable controller 112 to re-configure exciter 103 from operating as an "inside out" field wound motor, to operating as a transformer, such as an air gap transformer. In other words, when synchronizing between the generator 104 and motors 106 as the shaft 110 is increasing from substantially zero speed up to its operational speed, controller 112 may provide an exciter voltage to exciter 103 that is of sufficiently "high magnitude and frequency" for inducing the terminal voltage $V_{GEN}$ at bus 114 that is needed to initiate and maintain rotation of motors 106 and load 108 synchronous with the increasing rotational speed of the generator 104.

In operation, referring to FIG. 4, controller 112 may determine speed of the shaft 110 that mechanically couples the prime mover 102, such as a jet engine, of the system to the AC generator 104 of the system (400). For example, during a period of time that is associated with the start-up of prime mover 102, controller 112 may provide a signal and/or command to prime mover 102 that causes shaft 110 to begin increasing from a zero speed to an operational speed. At the start of system 100, controller 112 may receive sensor information indicating a speed of shaft 110 as prime mover 102 begins mechanically spinning or rotating shaft 110. In other examples, controller 112 may infer the speed of shaft 110 based on voltage and/or current measurements taken within the system 100 (e.g., from AC generator 104, for example). In any case, this start-up phase (e.g., lasting anywhere from between zero and five seconds) also causes the rotors of exciter 103 and generator 104 to begin spinning congruently with shaft 110. While the speed of shaft 110 is at substantially zero, or at any time before shaft 110 is at a predetermined full operational or rated speed at which AC generator 104 drives each of motors 106 and loads 108, controller 112 may induce excitation in system 100 so as to cause motors 106 and loads 108 to "spin-up" or be induced (energized) to rotate in-synch with AC generator 104.

Controller 112 may determine, based on the speed of the shaft, a level of a field current $I_{FIELD}$ needed to excite the AC generator 104 and synchronize the AC generator 104 to one or more electrical motors 106 that are electrically coupled to the AC generator and are configured to drive one or more mechanical loads 108 (410). For example, controller 112 may utilize a function or a look-up table of values to determine the level of field current $I_{FIELD}$ needed by AC generator 104 to produce a terminal voltage $V_{GEN}$ at bus 114 that is of sufficient strength (e.g., magnitude and frequency) to begin turning motors 106 and loads 108 as shaft 103 spins with substantially zero or less than operational speed. In some examples, controller 112 may input the speed into a function or look-up table and determine, based on the function or look-up table, that the level of the field current $I_{FIELD}$ is at a maximum level of current when the speed of the shaft is at substantially zero speed or that the level of the field current is at a minimum level when the speed of the shaft is at an a operational speed (e.g., 3300 RPM or some other speed needed to drive AC generator 104 to produce the required $V_{GEN}$ at bus 114).

In some examples, in addition to determining the speed of the shaft 110, controller 112 may determine a power factor of the AC generator 104 and changes, over time, in the speed of the shaft 110 and the power factor of the AC generator 104. In this case, controller 112 may determine the level of the field current $I_{FIELD}$ (needed to excite the AC generator sufficiently to maintain synchronized rotation of the AC generator with rotation of one or more electrical motors that are electrically coupled to the AC generator and configured to drive one or more mechanical loads) based on the speed of the shaft 110, the power factor of the AC generator, and changes, over time, in the speed of the shaft 110 and the power factor of the AC generator. In other words, the function, look-up table, and/or algorithm that controller 112 may use to determine the field current $I_{FIELD}$ needed for a particular load condition may be dependent on more than just the rotational speed of the shaft 110. Controller 112 may input at least one of the rotational speed, the power factor, or changes in the speed and/or the power factor, into a function and/or look-up table and determine, based on an output from the function and/or look-up table, the level of the field current $I_{FIELD}$.

The excitation system 105 may adjust the excitation signal, such as the field current $I_{FIELD}$, to maintain the power factor of the AC generator in a predetermined range, such as greater than −0.9, less than +0.9, or otherwise near 1.0, as the power factor fluctuates in the predetermined range. As the speed of the shaft 110 changes and the power factor changes, controller 112 may update its determination at any given time regarding the level of field current $I_{FIELD}$ needed to excite the AC generator and maintain the AC generator 104 synchronized to one or more electrical motors 106 that are electrically coupled to the AC generator 104 and configured to drive one or more mechanical loads 108 at the given time. In other words, the function and/or look-up table used by controller 112 may factor in changes in speed and/or power factor to cause controller 112 to adjust the field current $I_{FIELD}$ accordingly.

Controller 112 may control the exciter 103 of the system 100 to cause the exciter 103 to output the level of the field current $I_{FIELD}$ to excite the AC generator 104 and synchronize the AC generator 104 to the one or more electrical motors (420). For example, controller 112 may synchronize AC generator 104 with motors 106 by varying the level of the field current $I_{FIELD}$ being output from exciter 103 during start-up of system 100, or at any other time, in response to controller 112 determining that the speed of the shaft 110, the power factor of the AC generator 104, and/or changes, over time, in the speed of the shaft 110 and the power factor of the AC generator 104.

In any case, if controller 112 determines that due to the speed or acceleration of shaft 100, that system 100 is a candidate for synchronization via exciter field current $I_{FIELD}$ control, controller 112 may control the field current $I_{FIELD}$ using a voltage output signal or command to control the exciter voltage. Although referred to herein as a "voltage output signal," control of exciter 103 by the controller 112 to output the field current $I_{FIELD}$ may be a command, a variable excitation voltage output by the controller 112, or a control signal provided directly to the exciter 103 to create the exciter voltage, or to a power supply or other device that may directly or indirectly create the exciter voltage to induce the exciter 103 to output the field current $I_{FIELD}$. The voltage output signal may cause application of an exciter voltage to the exciter 103 that has a sufficient magnitude or frequency to induce (even when the shaft 110 is at substantially zero speed) a field current $I_{FIELD}$, and therefore a terminal voltage $V_{GEN}$, at the AC generator 104 that causes the one or more electrical motors 106 to drive the one or more mechanical loads 108. For instance, in some examples, the terminal voltage $V_{GEN}$ is a minimum voltage needed by motors 106 to accelerate loads 108 from substantially zero speed. By utilizing the principles of Table 1, controller 112 may apply a relatively high level of exciter voltage at a relatively high frequency, to the armature of exciter 103 such that a field current $I_{FIELD}$ is induced out of exciter 103, even if shaft 110 is not spinning or spinning slowly. As the speed of shaft 110 increases to operational speed, controller 112 may reduce the magnitude of the exciter voltage back down to predetermined operating levels associated with the operational speed(s).

In some examples, controller 112 may apply the exciter voltage directly (e.g., via an internal voltage source) using the voltage output signal. In other examples, exciter 103 may include a variable voltage source and controller 112 may control the variable voltage source of exciter 103 to output the exciter voltage based on the voltage output signal to produce a sufficiently high voltage or frequency at the field coil of exciter 103 to induce a terminal voltage $V_{GEN}$ at AC generator 104 that causes motors 106 to drive loads 108.

In some examples, controller 112 may continue to monitor the speed of shaft 110, the power factor of AC generator 104, the magnitude of the terminal voltage $V_{GEN}$, the level of field current $I_{FIELD}$ out of exciter 103, and the rotational speed or acceleration of loads 108 and dynamically adjust the amount of excitation that controller 112 applies to exciter 103 accordingly. For example, controller 112 may dynamically adjust the exciter voltage to exciter 103 by decreasing a magnitude of the exciter voltage in response to determining an increase in the rotational speed of the shaft 110 or an increase in a speed of the one or more mechanical loads. For example, controller 112 may dynamically decrease the magnitude of the exciter voltage proportionally to the level of increase in the speed of the shaft 110, or an increase in the speed of the one or more mechanical loads. In other words, at speeds where the DC excitation becomes effective, as the speed of shaft 110 increases or as the speed of the one or more mechanical loads 108 increases, controller 112 may decrease the level of exciter voltage or in some examples, may transition to modulated low voltage DC excitation, since the increasing speed of shaft 110 or the increasing of the speed of the one or more loads 108 may naturally lead to an increase in the level of field current $I_{FIELD}$ out of exciter 103, and thereby lead to an increase or maintaining of the level of the terminal voltage at bus 114.

In some examples, as also described elsewhere, controller 112 may monitor the power factor of AC generator 104 and dynamically adjust the field current by adjusting the magnitude or frequency of the exciter voltage so as to substantially maintain unity power factor. As used herein, substantially maintaining unity power factor refers to maintaining the power factor within a predetermined range of unity such as +/−0.1, such that the power factor ranges from 0.90 lagging to 1.10 leading. For example, controller 112 may dynamically vary the exciter voltage magnitude and frequency to increase the field current $I_{FIELD}$ to move the power factor to the lagging region (e.g., in response to determining the power factor is greater than one or "leading"). Conversely, controller 112 may dynamically vary the exciter voltage magnitude and frequency to decrease the field current $I_{FIELD}$ to move the power factor to the leading region (e.g., in response to determining the power factor is less than one or "lagging").

In some examples, controller 112 may apply the exciter voltage to the exciter, so as to induce a field current $I_{FIELD}$ and terminal voltage, at low speeds by setting the magnitude of the exciter voltage to a maximum voltage when the speed of the shaft is at a substantially zero speed and setting the magnitude of the exciter voltage to a minimum voltage when the speed of the shaft is at an operational speed. In other words, controller 112 may utilize the principles of Table 1 and as described above to use a relatively high magnitude and frequency exciter voltage when the speed of shaft 110 is low (e.g., less than operational speed) and use a lower magnitude and frequency exciter voltage when the speed of shaft 110 is high (e.g., at operational speed).

By energizing exciter 103 with a particular high level and high frequency voltage in this way, controller 112 may control the field current $I_{FIELD}$ output from exciter 103 even at low rotational speeds. Controller 112 may control exciter 103 using a speed independent exciter armature or exciter voltage, and therefore, dynamically control the field current $I_{FIELD}$ providing the magnetic flux of the rotor of generator 104 so as to permit a significant terminal voltage $V_{GEN}$, even at very low shaft speeds. The significant terminal voltage $V_{GEN}$ may induce current flow in the attached load motors 106 and thus torque, thereby accelerating load motors 106 to match the electrical speed of generator 104.

As the components of system 100 spin-up to a predetermined operational speed, the exciter field energizing voltage may increase in frequency, decrease in AC magnitude, and an additional DC component may increase. Near operational speed, the AC component of the exciter field voltage may be eliminated and controller 112 may use techniques, such as power factor control, to control the DC component to ensure continued synchronization of synchronous load motors 106 under varied load conditions.

Figure 5:
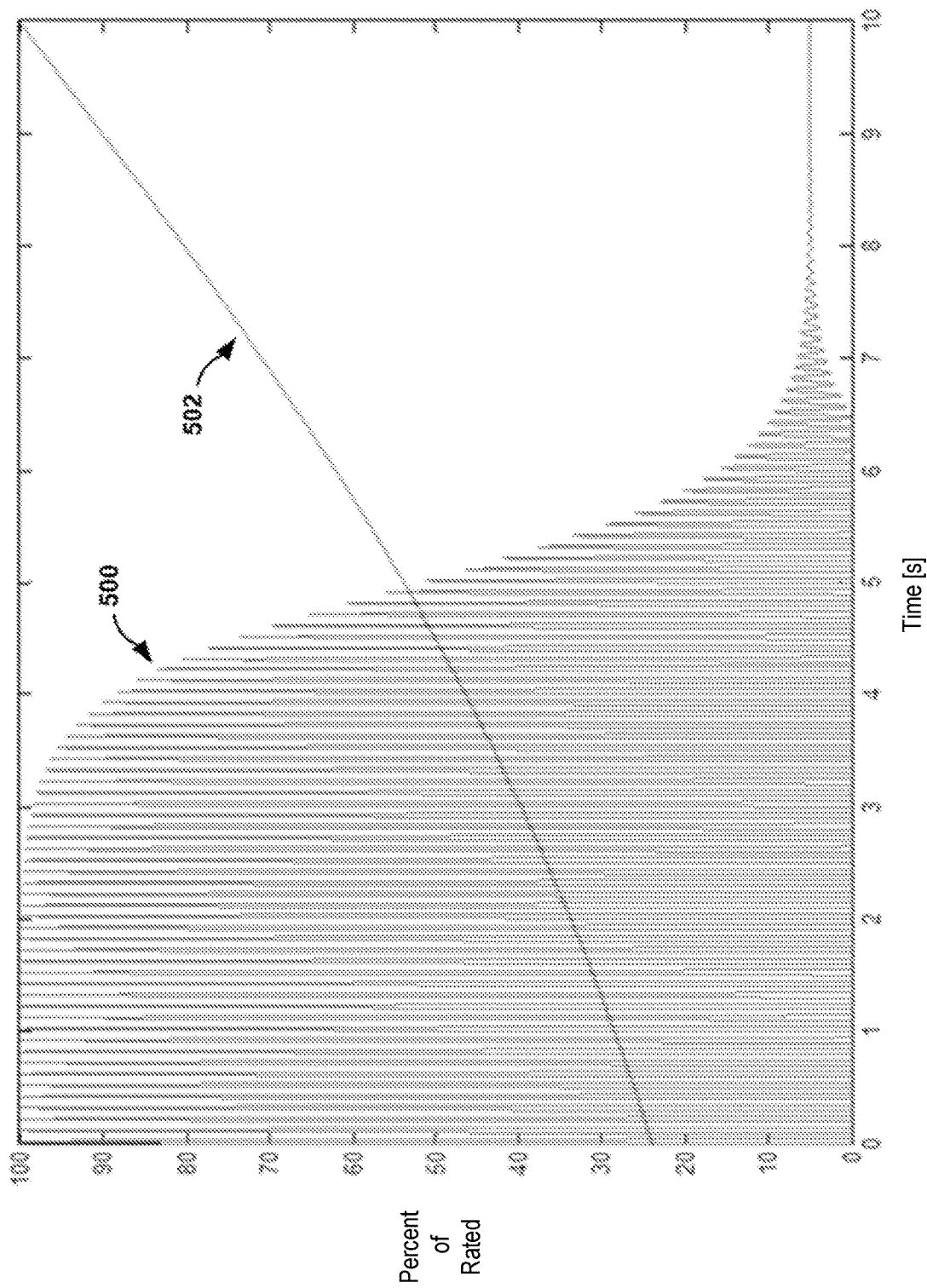
FIG. 5 is a diagram illustrating a variable exciter voltage as compared to rotor speed of an example synchronous power system for providing electrical power from an alternating current generator to one or more motors, in accordance with one or more aspects of the present disclosure.

FIG. 5 is a diagram illustrating a variable exciter voltage 500 as compared to rotor speed (ω) 502 of an example synchronous power system, such as system for providing polyphase electrical power from an alternating current generator to one or more motors, in accordance with one or more aspects of the present disclosure. For example, with reference to Table 1, FIG. 5 shows the variable exciter voltage 500 delivered to an exciter, such as exciter 103, being at 260V, 200 Hz when the rotor speed (ω) 502 of a generator, such as generator 104, is low or (substantially zero RPM). As the rotor speed (ω) 502 of generator increases, a controller, such as controller 112, may decrease the magnitude of the exciter voltage. For instance, when the rotor speed (ω) 502 of generator reaches approximately 1000 RPM or ⅓ its operational speed, controller 112 may apply a 100V, 200 Hz exciter voltage to the exciter. And eventually, once the rotor speed (ω) 502 of generator reaches approximately 3300 RPM and higher, up to is maximum operational speed, the controller may decrease the magnitude of exciter voltage further, eventually only applying only a minimal 5V, 0 Hz exciter voltage to the exciter.

In examples where the generator includes a relatively high impedance when compared to a relatively low impedance of motors, such as motors 106, the voltage at the output of the generator may be largely dictated by the motors. For example, the impedance of the generator may be three or four per unit (p.u.) and the impedance of the motors, as viewed from the generator may be one or two p.u. In such examples, changes in the exciter voltage supplied to the generator may result in changes in a magnitude of current output of the generator with relatively little change in voltage output of the generator due to the flux linkage between the synchronized generator and motors.

During a startup condition, such as when the speed of the generator is substantially zero and first begins to rotate, or at rotational speeds of less than full speed, such as less than 50% of rated speed of the generator, the motors and the generator may be synchronously rotating. Under these conditions, the synchronous coupling, or magnetic coupling, between the generator and the motors may be a relatively "loose" coupling or a relatively low "stiffness" in the magnetic coupling of the generator rotor and the motor rotors due to the low rotational speed conditions. (e.g. low change in electrical torque transfer with electrical angle of displacement of motor(s) with respect to generator) For example, a high per unit generator with low per unit load motors and fixed exciter current may have a significantly reduced increase in power with motor electrical displacement angle.

As described herein, a "loose coupling" or "stiffness" refers to the capability of the rotors of the motors and the generator to maintain electrical phase synchronization during changing operating conditions, such as perturbations within the system 100. Such perturbations or disturbances may be, for example, a result of changes in the load, such as load 108, on one or more motors, changes in rotational speed of the generator, and/or changes in the field current supplied to the generator. Examples of other changing operating conditions may include changes in the rotational speed of both the generator 104 and corresponding synchronized motors 106. The robustness of the magnetic coupling due to synchronization of the generator rotor and the motor rotors may be affected by system operating conditions such as the rotational speed, the magnitude of current flow to the motors, and the power factor angle. As the rotational speed of the generator 104 increases, and/or the current flow to the motors 106 increases, the magnetic coupling between the generator 104 and the motors 106 may increase in stiffness making a loss of synchronism between the generator 104 and the motor 106 less likely to occur. In addition, a power factor angle between the voltage and current that is lagging may result in a stiffer coupling when compared to, for example, a unity power factor.

At the time or before the generator first begins to rotate, via mechanical rotational force, such as provided by a prime mover, the motors may be synchronized with the generator. Since the motors are also not rotating at this time, magnetic coupling between the generator rotor and the motor rotors has not yet been established. Establishment of such magnetic coupling will result in the motors beginning to rotate synchronously with the electrical frequency of the generator.

At substantially zero, or very low rotational speed of the generator, the generator may be excited by the exciter to generate electric power, which is supplied to the motors. The generated electric power may be supplied at sufficient voltage and current to overcome any anti-rotational forces present at the motors. Due to the absence of rotation (or low frequency rotation of the generator—such as less than one or two Hz) the magnetic coupling of the rotor of the generator and the rotor of the motors may be initiated or enhanced by selectively increasing and decreasing, or pulsing, the electric power output of the generator. The generator output may be selectively pulsed to coincide with the position of the motor rotors so that a relatively high magnitude of electric power is provided while the rotor of the generator and the motor rotors are substantially aligned, and conversely a relatively lower magnitude of electric power is provided while the motor rotors are substantially out of synchronous alignment with the generator rotor. During the pulses while the rotors are substantially aligned, the stiffness of the magnetic coupling between the generator rotor and the motor rotors is increased such that the motors are induced to begin rotating in electrical synchronism with the generator. In addition, in response to the magnetic coupling of the generator and the motors, a bus voltage may be established and maintained while the magnetic coupling is maintained.

Figure 6:
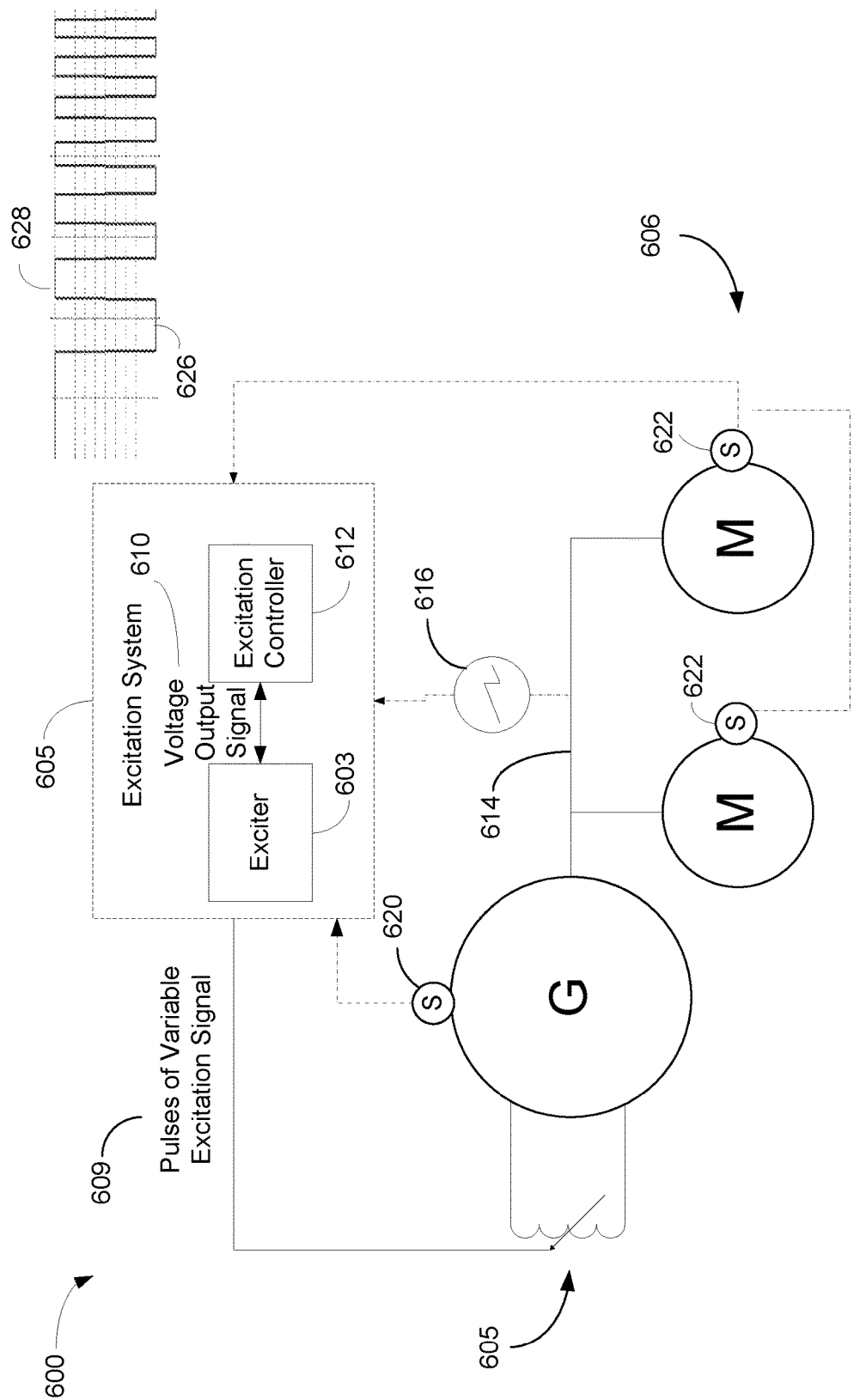
FIG. 6 is a conceptual diagram illustrating a portion of an example synchronous power system for providing electrical power from an alternating current generator to one or more motors, in accordance with one or more aspects of the present disclosure.

FIG. 6 is a block diagram of an example system 600 that includes a generator 604 having a rotor 605 and providing a voltage and current at an output 614 of the generator 604 in accordance with a field current $I_{FIELD}$ 609 supplied by an excitation system 605. The excitation system 605 includes an exciter 603 controlled by a controller 612. The excitation system 605 outputs a variable excitation signal 609, such as the field current $I_{FIELD}$, to supply motors 606, such as synchronous motors, that are driving loads. For the sake of brevity and ease of description, system 600 is described within the context of system 100 of FIG. 1, system 200 of FIG. 2 and system 300 of FIG. 3. For example, exciter 603 and generator 604 of system 600 represent examples similar to, respectively, exciter 103 and generator 104 of system 100 or exciter 203 and generator 204 of system 200 or exciter 303 and generator 304 of system 300. Exciter 603 and generator 604 are controllable by controller 612 of system 600, which represents an example similar to the controllers 112 and 212 and 312 of systems 100 and 200 and 300.

The controller 612 operable as an excitation controller within the excitation system 605 may monitor the voltage and/or current of two or more phases at the output 614 of the generator 604 using a power sensor 616. The output 614 may also be considered the system bus, or system voltage and current. The power sensor 616 may be a current transformer (CT), a potential transformer (PT) or any other form of voltage and/or current measurement device capable of outputting phase related measurement signal(s) to the controller 612. Based on the sensed voltage and/or current, the excitation system 605 may output pulses of the excitation signal 609 in either one or both of a first operational stage and a second operational stage. The first and second stages may occur during startup of the system 600, when motors 606 are not yet rotating in synchronism with the generator 606.

Pulses of the excitation signal 609 may be based on pulses of a voltage output signal 610 by the excitation controller 612. The voltage output signal 610 may transition between a AC waveform at relative low generator speeds, and transition to a DC waveform at relatively high generator speeds. During startup of the system 600, when the motors 606 are not yet rotating in synchronism with the generator 606, and the generator 604 is not rotating, or rotating relatively slowly, the voltage output signal 610 may be in the form of an AC waveform, or sinusoidal voltage output signal, if the exciter 603 is also stopped or rotating at the relatively low speed. As previously discussed, at stopped or low speed, the exciter stator of the exciter 603 may not induce EMF in the exciter rotor of the exciter 603 unless the voltage output signal 610 (exciter voltage) is an AC waveform signal. Thus, the magnitude of step change pulses of the excitation signal provided to the generator 604, are in accordance with a step change in the magnitude of the sinusoidal voltage output signal 610 provided by the excitation controller 612.

In the first stage, rotation of the generator 604 has not yet begun. Pulses of the excitation signal 609 output during the first stage may temporarily energize the motors 606. The temporary energization of the motors 606 may create torque producing current at the motors 606, causing the rotors of the motors 606 to move, or rotate towards synchronous alignment with the rotor of the generator 606. The degree of rotational movement of the motors 606 may be dependent on the relational position of the motor rotors and the generator rotor and the static friction of the motors 606. The static friction of the motors 606, or stiction, may include mechanical friction and counter torque, or back EMF present in the motors 606. Movement of the motors 606 in response to receipt of the excitation pulses may be in the form incremental changes in rotational position of the motor rotors.

These incremental movements may also urge alignment of the rotors of different motors 606 into a similar electrical position in preparation for synchronization. In addition, or alternatively, the incremental movements may be a rocking motion due to the motors 606 being in equilibrium. Such a rocking motion may indicate that the motor rotors have been urged into mutual alignment between the motors 606 and with the rotor of the generator 604. In addition, the rocking motion may transition the rotatable rotors of the motors 606 to dynamic friction, which may be lower than static friction of stationary rotors, and therefore require less torque to being rotation of the motors 606 in synchronism with the generator 604 upon the generator commencing rotation.

The excitation pulses provided by the excitation system 605 may occur repetitively on a predetermined schedule, such as at a predetermined time interval. Alternatively, or in addition, the excitation pulses may be at a predetermined frequency and at a predetermined time interval. In addition, or alternatively, a position of rotors of the motors 606 may be monitored with the excitation system 605, and the excitation pulses may be applied until the motor rotors no longer move or are subject to a rocking motion (dynamic friction) in response to receiving a pulse. Individual positions of motor rotors, or an average of positions of the motor rotors may be used.

In the second stage, rotation of the generator 604 has commenced. The excitation system 605 may provide pulses of the variable excitation signal to coincide with the electrical alignment of the generator 604 and motors 606. Thus, the pulses of the variable excitation signals may be provided at times when the generator rotor and the motor rotors are substantially aligned to urge or initiate synchronism. The position of the rotors of the motors 606 and/or the generator 604 may be sensed, or estimated. In addition, or alternatively, an average position of the generator and/or motor rotors may be used.

In an example, during the second stage, the excitation system 605 may selectively output a pulse of the variable excitation signal at a fundamental synchronization frequency of the generator power output, such as at 2 Hz or 4 Hz. The fundamental synchronization frequency may be once per electrical cycle in accordance with the rotational speed and corresponding electrical frequency of the generator 604. In other examples, two pulses of the excitation signal may be output during a cycle of the fundamental synchronization frequency of the voltage and current output of the generator 604.

The pulses of the excitation signal may have step change in magnitude sufficient to induce torque producing current flow at the motors. The step change of the excitation level may be from a lower level to a higher level. The lower level may in a range from zero to a level that would produce an open circuit flux linkage similar to that of the synchronous motor loads, or in other words, an excitation signal of sufficient magnitude to create an effective rated motor voltage at rated motor frequency. The higher level may be a step change above the lower level such as to a level at which saturation of open circuit flux linkage similar to that of the synchronous motor loads occurs, or in other words, an excitation signal of sufficient magnitude to create a percentage overvoltage above effective rated motor voltage at rated frequency. Accordingly, the back EMF flux linkage of the generator 604 may be pulsed between, for example, nominal full load flux linkage (lower level) and some predetermined percentage above the nominal full load flux linkage (upper level).

During the first stage, the magnitude of the pulses may be a step change from an excitation signal presently being applied to the generator to a higher magnitude excitation signal, such as 20% higher. Such a step change in the magnitude of the excitation signal may have a step change impact on the generator current output to the motors 606. For example, torque producing current flow to the motors 606 may double in response to a 120% pulse of the excitation signal. In an example, as illustrated in FIG. 6, the excitation signal during the first stage may be a step repetitive change in magnitude from a zero % level 626 to 100% level 628. As further illustrated in FIG. 6, the excitation pulses may occur at with a variable predetermined frequency resulting in a predetermined variable time interval between excitation pulses. In other examples, other step changes, such as from 80% to 100%, and other variable predetermined frequencies may be used.

In the second stage, the step change may also be from a currently level of magnitude of the excitation signal to a 20% higher (or more) magnitude of the excitation signal. For example, the pulse of the excitation signal during the second stage may be a step change pulse from 100% excitation signal output to 125% excitation signal output. In other examples, other step changes in the magnitude of the excitation signal that result in a desired amount of torque producing current may be used during the second stage.

The position of the generator rotor may be provided by a position signal provided to the excitation system 605 by a generator sensor 620. The generator sensor 620 may be a shaft position sensor, such as an optical shaft encoder, a linear hall effect sensor, or any other form of sensing device capable of sensing position of the generator rotor. Alternatively, the position of the generator rotor may be estimated based on the voltage and phase angle sensed with the power sensor 616. In addition, the generator sensor 620 may provide a rotational speed of the generator 604. A position of each of the motor rotors may be provided by a respective position signal provided to the excitation system 605 by respective motor sensors 622. The motor sensors 622 may be a shaft position sensor, such as an optical shaft encoder, a linear hall effect sensor, or any other form of sensing device capable of sensing position of a motor rotor. Alternatively, the position of a motor rotor may be estimated based on the voltage and phase angle sensed with the motor sensor 622 at each motor. In addition, the motor sensor 622 may provide a rotational speed of the respective motor 606. The generator sensor 620 and/or the motor sensor 622 are optional and may be omitted.

The excitation system 605 may cause pulses to turn 'on' at the moments in time when the generator rotor and synchronous motor load rotors are aligned with one another. Note that with multiple motor rotors in the system 600, this may be the average position of the rotors. Once the rotors have just passed through alignment relative to one another and are moving out of alignment, the addition of field excitation may have the effect of trying to pull the relative positions of the rotors back together, thus reducing the momentum of frequency slip. Conversely, when the rotor positions have revolved past their most misaligned position, and are moving back towards alignment, removal, reduction, or reversal of the field excitation pulses may be implemented to avoid additive misalignment. Adding additional positive excitation while the rotors are already moving towards alignment may increase the speed at which the rotors move towards alignment. The increased speed at which the rotors move toward alignment may increase the momentum of the frequency slip such that once the rotors pass through alignment, the rotors may significantly overshoot alignment. By removal, reduction, or reversal of the field excitation pulses, such significantly overshooting alignment may be reduced.

Commencing rotation of the generator 604 may be initiated with a prime mover driving a shaft that is coupled with the generator 604. In example systems where it may not be desirable to maintain the prime mover at a relatively slow rotational speed, an auxiliary rotational source may be coupled with the generator 604. Examples of systems where maintained slow rotational speed of the prime move may include systems where the prime mover operates with fixed linearly increasing speed once started, or where control of a prime mover at such low speeds lacks the granularity to maintain such a slow rotational speed. In such systems, the prime mover may remain off, or not driving the generator 604, until such time as the second stage is completed and a ramped uniformly increasing speed is desired to bring the generator up to full rated speed. The auxiliary rotational source may be an electric motor or other source of mechanical rotational force that may be controlled to achieve and maintain a relatively slow rotational speed upon demand. In such a system, the controller 612 may control the activation and speed of the auxiliary rotational source, as well as transition from the auxiliary rotational source to the prime mover.

In an example system 600, an auxiliary rotational device, such as an electric machine, is available on the same shaft/drivetrain, such as a 'hotel' generator. In this example system, the auxiliary rotational device is capable of operating as a motor or as a generator. Thus, the auxiliary rotational device may be used as a motor to provide a controlled slow start of the generator 604, such as via generator shaft, before the prime mover is introduced. For example, where the prime mover is a jet engine, the auxiliary rotational device may rotate the generator at relatively low rotational speed as controlled by the controller 612 prior to any actual engine combustion within the jet engine being introduced. This would allow the system 600 to come up to a very low speed synchronized condition before introducing fuel. This example system may allow operation in the second stage during starting, where a relatively low speed (such as about 10 rpm) may be held while synchronization of the generator 604 and the motors 606 occurs. Then, the motors 606 are synchronized with the generator 604, starting of the prime mover, such as engine starting, may be commenced. Thus, the motors 606 may be synchronized with the loads before the prime move is started.

Figure 7:
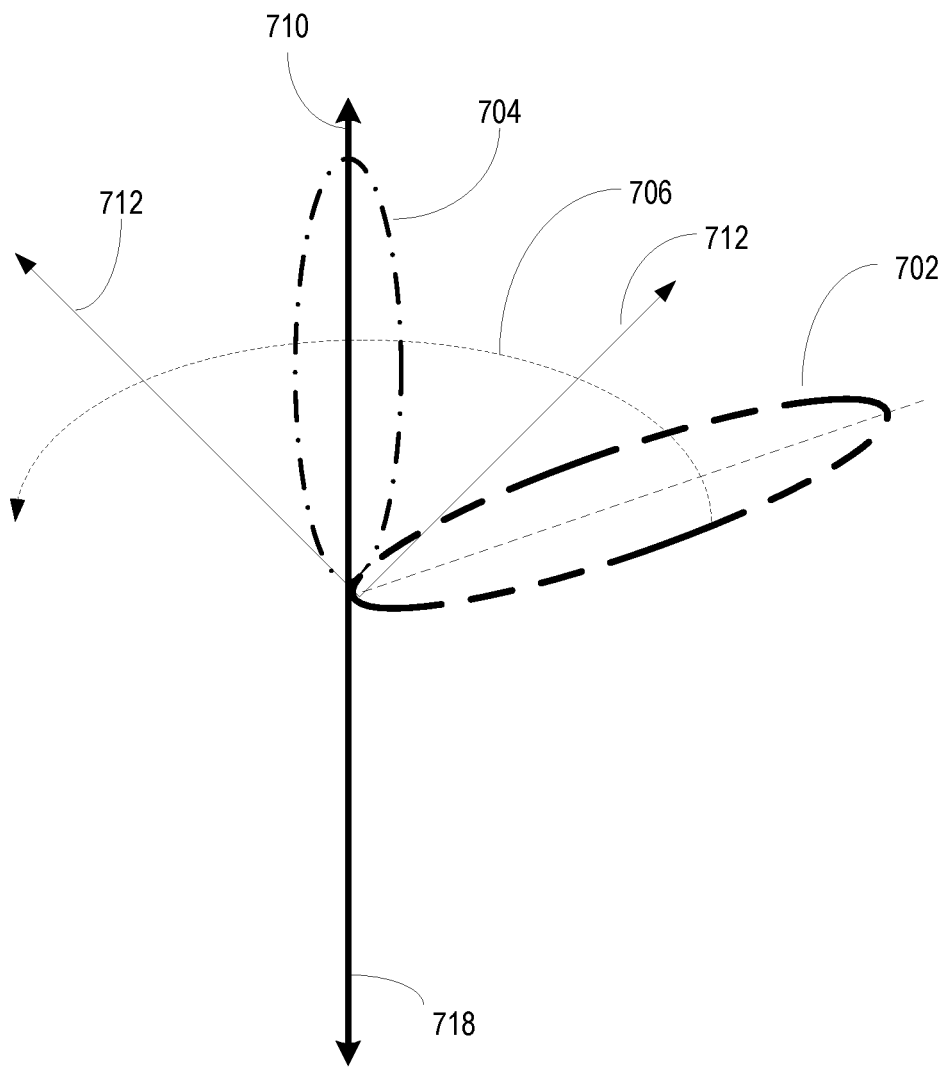
FIG. 7 is an example representation of a generator rotor vector and one or more motor rotors vector, or an average of the motor rotor vectors.

FIG. 7 is an example representation of a generator rotor vector 702 and one or more motor rotors vector 704, or an average of the motor rotor vectors. It should be understood that FIG. 7 is not an accurate representation of multi-phase current and voltage vectors or flux linkage between the generator 604 and the motors 606, but rather is a simplified diagram provided for the reader to facilitate a basic understanding of simplified electrical phase alignment of the generator rotor vector 702 and the motor rotors vector 704. In FIG. 7, the motor rotors vector 704 are illustrated as remaining stationary, whereas the generator rotor vector 702 is illustrated by arrow 706 as rotating in a counterclockwise direction. Also, although illustrated in FIG. 7 as "phasing" positioning of a generator rotor vector 702 and a motor rotors vector 704, it is to be understood that it is electrical phase alignment of the poles of the generator rotor and the motor rotors that provide flux linkage, corresponding voltage, and represent synchronism.

As previously discussed, the excitation system 605 may selective pulse the excitation signal so that a pulse 710 is present during a time when the moving generator rotor vector 702 and the stationary motor rotors vector 704 are substantially aligned. Ideally, the pulse 710 may occur when the generator rotor vector 702 is aligned with the motor rotors vector 704 as illustrated by the position of the pulse 710 with respect to the position of the motor rotors vector 704. In FIG. 7, however, upon substantially alignment of the rotor vectors 702 and 704 enough torque producing current may be provided at the motors 606 to cause the motors 606 to change position, or rock back-and-forth into synchronism during the first stage. During the second stage, flux linkage and synchronism may be established between the generator 604 and the motors 606 due to occurrence of the pulse 710 as the generator rotor vector 702 sweeps past the motor rotors vector 704.

As used herein, the term "substantially aligned" refers to the pulse of the excitation signal occurring within +/−90 degrees of the phase of the rotor poles as illustrated by the window edges 712 in FIG. 7. In order to generate the excitation signal when alignment can occur, the exciter voltage may be applied before the phase of the rotor vectors 702 and 704 substantially align. Thus, the exciter voltage may be applied by the excitation controller 612 before the generator rotor vector 702 enters the window of substantial alignment with the motor rotors vector 704, such as when the generator rotor vector 702 is in the position illustrated in FIG. 7, to account for system lag. Since the generator rotor is moving at a relatively low rotational speed, such as 30 RPM, and correspondingly low electrical frequency, by the time the generator rotor vector 702 becomes substantially aligned with the motor rotors vector 704, the generator 604 may be outputting additional torque producing current in response to the pulse 710 of the variable excitation signal.

The pulse 710 of the excitation signal generated by the excitation system 605 may be a positive pulse of increased magnitude due to the phasing of the poles of the generator and motor rotors being substantially aligned. In some examples, a second pulse may be applied by the excitation system 605 as a negative pulse 718 to decrease the level of flux linkage between the generator rotor and the motor rotors. The negative pulse 718 may be applied to the generator 604 when the generator rotor vector 702 is substantially 180 degrees in phase (where substantially=+/−90 degrees) away from the position of the motor rotors vector 704, as illustrated in FIG. 7. The negative pulse 718 may be, for example, a negative 120% step change in magnitude in order to urge the motor rotors to move toward synchronous alignment with the generator rotor.

The excitation system 605 may selectively provide the pulses of the variable excitation signal based on the relative positions of the generator rotor and motor rotors. The relative positions may be determined in any number of ways, such as, for example: 1) by actual measurements; 2) by model based estimation; 3) by monitoring of apparent power; and/or 4) by pulsed excitation at an accelerating angular difference.

The relative position of the generator rotor with respect to the motor rotors may be based on a measured position of the generator rotor and an average of the measured positions of the motor rotors. Alternatively, only one of the measured positions of the generator and motor rotors may be used to determine when to provide the pulse of the excitation signal. In another example, model based estimation may be used by the excitation system 605 to determine the timing of when to output a pulse of the variable excitation signal. In the model based estimation, a flux estimation model may be used to identify, for example, a generator rotor position using feedback of the generator output voltage.

In another model based approach, an angular difference between the generator rotor and the motor rotor may be found by the excitation system 605. The angular difference may be based on estimated relative positions of the motor rotors and the generator rotors. In an example, model based approach, the angle of the generator 604 may be estimated based on the measured voltages and currents and corresponding phase angle at the output 614 of the generator 604. In addition, based on the voltage and current magnitudes at the output 614, an estimated average motor rotor position may be established. Such modeling may be based on simulation of operation of the system at various generator startup speeds, or other system parameters, or actual testing of the system and measurement of such system parameters, to obtain corresponding generator rotor and motor rotor position estimates. Once the estimated positions of the generator rotor and the motor rotors have been established to correspond to system operational parameters, these estimated positions may be used in connection with parameters of the system observed during startup. Using the estimated positions, the excitation system 605 may selectively output pulses during the first and second stages based on the parameters and the estimated positions to achieve synchronized operation of the generator 604 and the motors 606.

Figure 8:
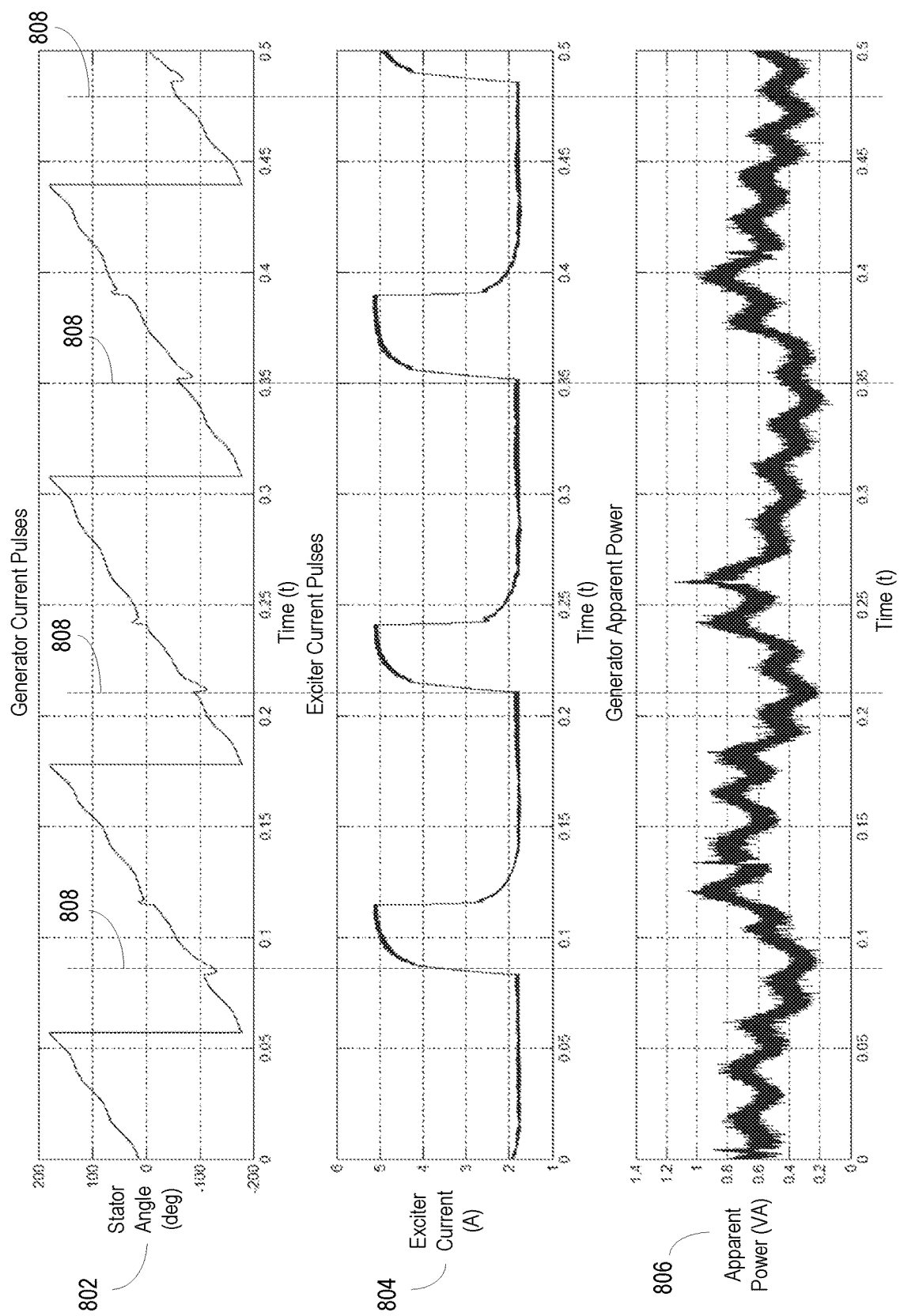
FIG. 8 is an example implementation of estimation of rotor position based on apparent power at an output of a generator.

FIG. 8 is an example implementation of estimation of rotor position based on apparent power at the output 614 of the generator 604. This may provide another mechanism for the timing for output of the pulses of the excitation signal during the first and second stages. In some example system 600, it may be impractical to directly sense or estimate the angles of all the motor rotors. Thus, the difference in angle between the generator rotor and load rotors may be inferred using measurements of current and voltage at the output 614 of the generator 604 (at the stator).

For example, while the generator 604 is rotating at low speed, and the loads are not synchronized (i.e. the motor rotors are twitching with dynamic friction with each pole passage), the apparent power seen at the generator stator may have a cyclic behavior which is periodic with these pole passages as illustrated in FIG. 8. As the average rotor position comes into alignment with the generator rotor position, the apparent power (voltage magnitude times current magnitude) at the generator output 614 may be minimized. Based on the minimized apparent power during each electrical cycle, occurrences of the apparent power minima (and hence where to apply the pulses) may be modeled.

Such modeling may, for example take the form of a real-time memory table to store and seek out where apparent power minima may occur. An example approach may use measured generator current vector angles as the x-axis of the table, and then record corresponding measurements of apparent power as the y-axis of the table. Limits and filtering may be necessary so that the table values change smoothly in time, depending on measurement and process noise of the system 600. Filtering, such as Kalman filtering, may also be applicable here due to the signal to noise ratios at relatively low currents and voltages associated with system startup. The minimum y-axis value of this table (apparent power) may be used to reference the corresponding x-axis location (current vector angle) at which the minima of the apparent power occurred. This referenced current vector angle may then be identified by the excitation system 605 as a point in time at which the field pulses should 'turn on.'

In FIG. 8, a stator angle of the generator 802 is time aligned with an exciter current of the excitation signal 804 and an apparent power indication 806. The stator angle of the generator 802 is representative of the current (Amps) pulse of the generator 604 resulting from the pulse in the excitation signal. The exciter current 804 (such as field current $I_{FIELD}$) represents the pulse of the variable excitation signal. The apparent power 806 is the absolute value of the measure voltage and current at the output 614 of the generator 604, which may be calculated by the excitation system 605.

This approach may be based on determination and modeling of minimum of apparent power. Apparent power may be observed relative to the measured current vector angle and/or the voltage vector angle to find minimums in apparent power during a predetermined period, such as during a positive half cycle (such as from 0 to 180 degrees) of the AC power output by the generator 604. The time during the positive half cycle of the minimum apparent power may be an indication of the synchronous alignment of the generator rotor and the motor rotors due to the minimum apparent power having a cycle that substantially aligns with the slip frequency. The slip frequency may be indicative of the increase and decrease in flux linkage as the electrical poles in the generator and the motors cyclically align and misalign prior to being electrically synchronized.

Based on modeling of the delay between the output of the pulse, and the corresponding increased output current of the generator 604, the excitation system may selectively apply pulses ahead of a projected minimum apparent power as illustrated by dotted lines 808 in FIG. 8. Alternatively, a high gain control may be used so that the generator reacts quickly to the output of pulses by the excitation system 605. Thus, during operation in at least one of the first stage and the second stage minimum apparent power may be used by the excitation system to selectively output pulses of the variable excitation signal.

Figure 9:
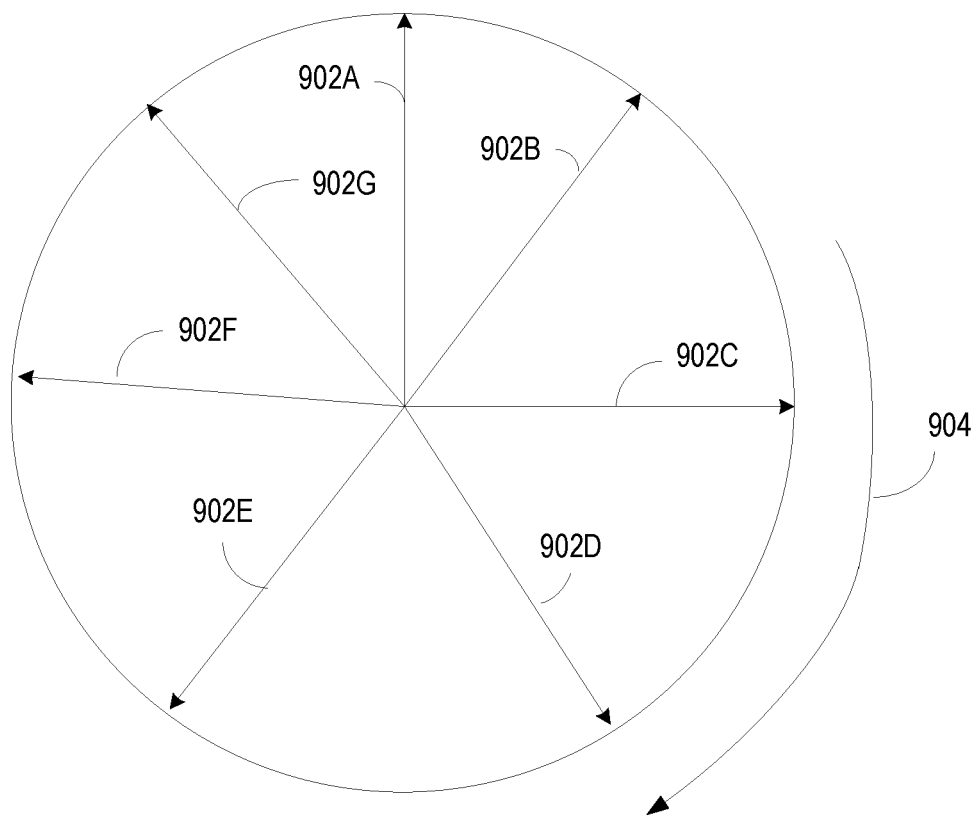
FIG. 9 is an example implementation of pulsed excitation at an accelerating angular difference.

FIG. 9 is an example implementation of pulsed excitation at an accelerating angular difference. In FIG. 9, a plurality of pulses 902 are shown at different angular locations in a polar plot. Instead of identifying an electrical position of the generator rotor and/or the motor rotors, a predetermined number of pulses may be applied at each of different angular locations so as to urge the motors 606 to become electrically aligned with the generator 604. For example, a predetermined number of pulses, such as one pulse in each cycle, of a predetermined increased magnitude, such as increased by at least 20%, may be applied as pulses 902A. Subsequently, a predetermined number of pulses may be applied as pulses 902B, followed by pulses applied at 902C, and so on through 902G, as indicated by arrow 904. The process of applying the pulses at different angular locations may be repeated at an accelerating rate in order to transition the motors electrically align the motors and/or transition the motors from static friction to dynamic friction. It is to be understood that any number of angular locations are possible, and that the pulses at different angular locations do not need to be sequential as illustrated in FIG. 9.

Based on the application of pulses at different angular locations, the rotors of the motors 606 may be attracted to the different locations. In addition, the movement of the pulses to different angular locations may encourage the motors 606 to begin to rotate, or at least rock back-and-forth so as to reduce stiction by transitioning the motors to dynamic friction. The application of pulses with accelerating angular difference may be used during the first stage or the second stage to initiate synchronization of the generator 604 and the motors 606.

The first stage or the second stage may be used independently and singly by the excitation system 605 to synchronize the generator 604 and the motors 606. Alternatively, the first stage and the second stage may be used cooperatively by the excitation system 605 to startup the system and synchronize the generator 604 and the motors 606 while the generator 604 is at substantially zero speed, or at a relatively small percentage of the rated speed of the generator 604. When using both the first stage and the second stage, the excitation system 605 may output pulses of the excitation system during the first stage to align the motor rotors. In addition, output of pulses during the first stage may be used to transition the motors from static friction to dynamic friction. Upon motor rotor alignment, and transition to dynamic friction, the excitation system may initiate rotational movement of the generator and output pulses of the excitation signal in the second stage. Pulses may be selectively output during the second stage to take advantage of the dynamic friction initiated during the first stage. In other words, timing of pulses during the second stage may be timed to occur when the rotors are rocking back-and-forth in an appropriate direction that coincides with rotation of the motors 606 in synchronism with the generator 604.

Figure 10:
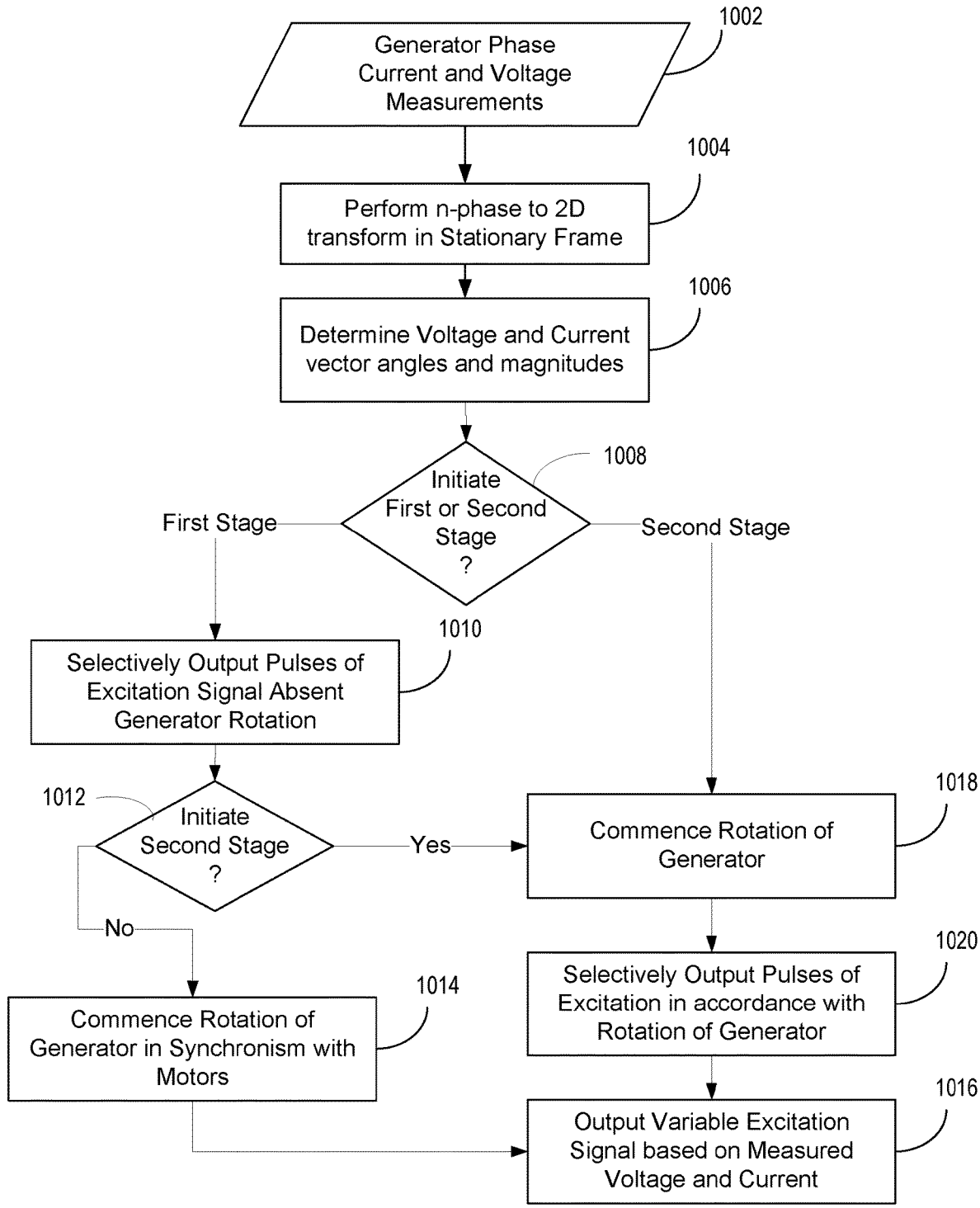
FIG. 10 is an operational flow diagram example of pulsed excitation system startup.

FIG. 10 is an operational flow diagram example of pulsed excitation system startup that is applicable to any of the system described, however, for ease of understanding, reference will be made to FIG. 6 unless otherwise noted. During operation, voltage and current may be sensed at the generator terminals 604 by a power sensor 616. (1002) In this example, the generator 604 may include multiple phase sets and the voltage and current signals from the sensor 616 may then be transformed such as by Clark's transform ($\alpha$, $\beta$) for a fixed frame of the stator to obtain two-dimensional Cartesian coordinates. (1004) For example, in a Clark's transformation, current differences between phase sets may be transformed into their own two dimensional (2D) stationary frame. Using the two-dimensional Cartesian coordinates, the magnitude and vector angles for the voltage and current may be determined, using, for example, arctan functions with appropriate filtering, or with a phase-locked loop to track angles. (1006) The excitation system 605, and more specifically the excitation controller 612 may use the voltage and current vector angles, to determine the timing of outputting pulses of the excitation signal to the generator 604. The viability of different approaches to obtain the magnitude and vector angles for the voltage and current may be dependent on other factors, such as voltage/current sensor quality, or processing power.

If, for example, a position sensor providing the shaft position of the generator 604 was provided to the controller 612, such that the position of the rotor was known by the controller 612, a Park's transform could be used in which the quadrature axis (q) provides the torque producing component and the direct axis (d) provides the reactive component. In FIG. 10, the use of sensed voltage and current is described, however, it should be understood that other sensed parameters, such as the shaft position may also be used by the excitation system 605 to selectively output the pulses of the excitation signal in order to synchronously align the generator 604 and the motors 606 during startup. Using, for example, the vector angles, and magnitudes of the voltage and current, a phase position of the generator rotor and the motor rotor may be determined by the excitation system so as to determine when to selectively output pulses of the excitation signal.

The excitation system 605 may determine phase positions, or phase segments within which to selectively output pulses of the excitation signal, such as the field excitation. This determination may be performed by the excitation signal 605 by determining to use at least one of the first stage or the second stage in accordance with the particular configuration and operational characteristics of the system 600. (1008) If first stage operation is warranted, the excitation system 605 may selectively output field pulses prior to the generator commencing rotation. (1010) Pulses may be selectively output at a predetermined time, duration, and or frequency as determined by the excitation system 605.

Following output of pulses during the first stage, the excitation system 605 may determine if second stage operation is warranted based on, for example, system configuration or characteristics and/or the status of the motor rotors following implementation of the first stage. (1012) If transition to the second stage is determined by the excitation system 605 to not be warranted due to the motors 606 being substantially synchronized with the generator 604, the excitation system 695 may commence rotation of the generator 604. (1014) Since the motors were substantially synchronized during the first stage, the excitation system 605 may output the variable excitation signal based on a voltage and current being supplied by the generator to the rotational synchronous motor loads during ramped increases in speed of the generator 604 to reach a predetermined rated rotational speed. (1016)

If, the excitation system 605 determines that operation in the second stage is warranted instead of first stage operation (1008), the controller 612 may commence rotation of the generator 604 (1018), and initiate output of pulses of the excitation signal in the second stage operation. (1020) Alternatively, if the excitation system 305 determines following first stage operation that second stage operation is warranted (1012), the excitation system may commence rotation of the generator 604 (1018), and initiate output of pulses during the second stage operation. (1020) Following successful synchronization during the second stage of operation, the excitation system 605 may output the variable excitation signal based on a voltage and current being supplied by the generator to the rotational synchronous motor loads during ramped increases in speed of the generator 604 to reach a predetermined rated rotational speed. (1016)

In the first stage and/or the second stage, output of the pulses may not be a step change of the excitation signal from 0% and 100% flux, but could instead may be 50% and 125%, for example. Using the first stage or the second stage, or cooperatively using the first stage and the second stage, the excitation system 605 may selectively output positive pulses when the generator rotor and the load rotors are substantially aligned, and avoid output of pulses, or output only negative pulses, when the generator rotor and the motor rotors become misaligned, such as more than 90 degrees in difference in the pole locations. Measurement of generator and load rotor positions may not be available, so positional estimations of the generator rotor and/or the motor rotors may be performed by the excitation system 605. In some examples, such estimations by the excitation system may require more computational power, and may have decreased accuracy at relatively low rotational speed of the generator 604. In an example, the excitation system 605, may reference these pulses with respect to the current vector angle at the output 614 of the generator 604. In this example, the excitation system 605 and more specifically, the excitation controller 612 may effectively infer the average relative angle between generator rotor and the motor rotors without necessarily measuring or estimating the positions of the rotors individually. Accordingly, as described with reference to FIG. 8, the pulses could be timed to be output, or be turned on, at the phase of the current vector where apparent power at the output 116 of the generator is minimal, and not output, or turned off, before apparent power is at its maxima. Alternatively, the excitation system 305 may use another approach by selective outputting pulses at turn-on angles in an open-loop manner, and sweeping through increasing angle increments at each cycle until synchronization is detected, as discussed with reference to FIG. 9.

In one or more examples, the operations described may be implemented in hardware, software, firmware, or any combination thereof. If implemented in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The subject-matter of the disclosure relates, among others, to the following aspects:

1. A system comprising:
   a excitation system configured to output a variable excitation signal; and
   a synchronous generator configured to generate power for a plurality of rotational synchronous motor loads based on the variable excitation signal;
   the excitation system configured to output the variable excitation signal based on a voltage and current being supplied by the generator to the rotational synchronous motor loads;
   the excitation system configured, in response to the rotational synchronous motor loads not rotating, to provide pulses of the excitation signal in at least one of a first stage or a second stage;
   the excitation system configured to selectively provide pulses of the variable excitation signal in the first stage to temporarily energize the rotational synchronous motor loads prior to rotation of the generator; and
   the excitation system further configured to selectively provide pulses of the variable excitation signal in the second stage after rotation of the generator commences, the pulses of the variable excitation at the second stage provided to coincide with the generator and the rotational synchronous motor loads being substantially in electrical alignment.

2. The system of aspects 1, wherein the excitation system is configured to provide pulses of the variable excitation signal in the second stage at times when the generator rotor and the motor rotor are substantially aligned to initiate synchronism.

3. The system as in either of aspects 1 or 2, wherein the excitation system comprises an exciter and an excitation controller, the exciter directed by the excitation controller to output a magnitude of the variable excitation signal, and the pulse of variable excitation signal being a step change increase in a magnitude of the variable excitation signal of at least 20%.

4. The system as in any of aspects 1-3, wherein the excitation system is configured to control the output of the variable excitation signal based on synchronous operation of the generator with the rotational synchronous motor loads after completion of at least one of the first stage or the second stage.

5. The system as in any of aspects 1-4, wherein the excitation system is configured to selectively provide pulses of the variable excitation signal in the first stage to urge alignment between rotors in each of the plurality of rotational synchronous motor loads.

6. The system as in any of aspects 1-5, wherein the pulses of the variable excitation signal are selectively applied during the first stage and the second stage based on a position of a rotor of the generator and an average position of a plurality of rotors of the rotational synchronous motor loads.

7. The system as in any of aspects 1-6, wherein the pulses of the variable excitation signal are selectively applied during the first stage and the second stage based on a magnitude of apparent power being output by the generator.

8. The system as in any of aspects 1-7, wherein the pulses of the variable excitation signal are selectively applied during the first stage and the second stage at a predetermined cycle and a predetermined accelerating angular difference.

9. A system comprising:
a excitation system configured to output a variable excitation signal; and
a synchronous generator configured to generate output power for a plurality of rotational synchronous motor loads in response to receipt of the variable excitation signal;
the excitation system configured to output a pulse of the variable excitation signal to the generator to urge the plurality of rotational synchronous motor loads into rotational electrical alignment with the synchronous generator based on a corresponding pulse of output power generated by the synchronous generator in response to receipt of the pulse of the variable excitation signal.

10. The system of aspect 9, wherein the pulse is a step change between a first magnitude of the variable excitation signal and a second magnitude of the variable excitation signal.

11. The system of aspects 9 or 10, wherein the excitation system is configured to output the pulse of the variable excitation signal in at least one of a first stage in which rotation of the generator and the plurality of rotational synchronous motor loads is absent, or a second stage in which rotation of the generator is present and rotation of the plurality of the rotational synchronous motor loads is absent.

12. The system of aspect 11, wherein the pulse is output once during an electric cycle in the second stage, a frequency of the electric cycle based on a rotational speed of the generator in the second stage.

13. The system of aspect 11, wherein the pulse is repetitively output at a predetermined frequency and at a predetermined magnitude in the first stage.

14. The system as in any of aspects 9-13, wherein the pulse of the variable excitation signal is selectively output to temporarily energize and initiate rotation of the rotational synchronous motor loads into electrical alignment.

15. The system as in any of aspects 9-14, wherein the pulse of the variable excitation signal is selectively output to temporarily energize and initiate transition of the rotational synchronous motor loads from static friction to dynamic friction.

16. The system as in any of aspects 9-15, where the pulse of the variable excitation signal is selectively output to initiate a flux linkage between the plurality of synchronous motor loads and the generator at a time of the generator and the plurality of synchronous motor loads being substantially synchronously aligned.

17. A system comprising:
an excitation system configured to output a variable excitation signal; and
a synchronous generator configured to generate power for a plurality of rotational synchronous motor loads based on the variable excitation signal;
the excitation system configured to output the variable excitation signal based on a voltage and current being supplied to the rotational synchronous motor loads;
the excitation system further configured, in response to absence of rotation of at least some of the rotational synchronous motor loads, to selectively provide pulses of the variable excitation signal in at least one of a first stage prior to rotation of the generator to temporarily energize the rotational synchronous motor loads, or a second stage after rotation of the generator commences, the pulses of the variable excitation signal at the second stage provided at times when a rotor of the generator and a rotor of the rotational synchronous motor loads are substantially aligned.

18. The system of aspect 17, wherein the excitation system is configured to selectively provide pulses of the variable excitation signal during the first stage at a same angular position a predetermined number of times, the excitation system further configured to subsequently provide pulses of the variable excitation signal during the first stage at another same angular position.

19. The system of aspect 17 or 18, wherein the variable excitation signal is a field current supplied to the synchronous generator, and the pulses of variable excitation are a step change in a magnitude of the field current of at least 20%.

20. The system as in any of aspects 17-19, wherein the pulses of the variable excitation signal are selectively provided at the first stage to urge the rotational synchronous motor loads into alignment with each other, and into synchronism with the generator.

Various examples have been described. These and other examples are within the scope of the following claims.

We claim:
1. A system comprising:
an excitation system configured to output a variable excitation signal;
a generator to generate power for a plurality of rotational motor loads based on the variable excitation signal;
an auxiliary rotational machine energized to rotate the generator at a relatively slow speed, the excitation system configured to output intermittent pulses of the variable excitation signal at a predetermined time to energize the motor loads into synchronous rotation with the generator at the relatively slow speed; and
a prime mover having a rotational speed control configured to linearly increase rotational speed of the generator from the relatively slow speed toward rated speed of the generator, the rotational speed control of the prime mover configured to start the prime mover and accelerate the rotational speed of the generator and the motor loads synchronously rotated therewith.

2. The system of claim 1, wherein the excitation system is configured to output intermittent pulses of the variable excitation signal at predetermined times during rotation at the relatively slow speed in accordance with a respective rotor position of the plurality of rotational motor loads, and output a variable level excitation signal to continuously power the motor loads.

3. The system of claim 1, wherein the excitation system is configured to output the intermittent pulses of the variable excitation signal at predetermined times to energize the motor loads into synchronous rotation with the generator at the relatively slow speed absent the prime mover linearly increasing the rotational speed of the generator from the relatively slow speed.

4. The system of claim 1, wherein the excitation system is configured to selectively output intermittent pulses at or before a projected minimum apparent power output of the generator to move the motor loads into synchronous rotation with the generator at the relatively slow speed.

5. The system of claim 1, wherein the excitation system is configured to selectively output intermittent pulses at different angular locations of a rotor of the generator to move the motor loads into synchronous rotation with the generator at the relatively slow speed, and also output a variable level excitation signal to continuously power the motor loads.

6. The system of claim 5, wherein the excitation system is further configured to repetitively output intermittent pulses with accelerating angular differences between the rotor of the generator and rotors of the plurality of rotational motor loads to move the motor loads into synchronous rotation with the generator at the relatively slow speed, and, output a variable level excitation signal to continuously power the motor loads.

7. The system of claim 1, wherein the excitation system is configured to selectively output intermittent pulses to coincide with the relatively slow speed of the generator being substantially in electrical alignment with the plurality of rotational motor loads, and output a variable level excitation signal to continuously power the motor loads.

8. A system comprising:
an auxiliary rotational machine;
a prime mover;
a controller configured to control the auxiliary rotational machine, the prime mover, and generation of a variable excitation signal; and
a synchronous generator driven by the auxiliary rotational machine at a relatively slow rotational speed or by the prime mover at a linearly increasing speed between the relatively slow rotational speed and a rated speed of the generator, the generator configured to generate output power for a plurality of rotational synchronous motor loads in response to receipt of the variable excitation signal;
the controller configured to intermittently output pulses of the variable excitation signal to the generator while at the relatively slow rotational speed provided by the auxiliary rotational machine to initiate rotation of the plurality of rotational synchronous motor loads into synchronous alignment with the rotation of the synchronous generator based on corresponding pulses of output power generated by the synchronous generator in response to receipt of the pulses of the variable excitation signal; and
the controller further configured to output a continuous variable excitation signal, start the prime mover and control transition of the rotational speed of the generator and rotational motor loads from the relatively slow rotational speed to the linearly increasing speed in response to the generator powering the rotational motor loads to synchronously rotate at the relatively slow rotational speed.

9. The system of claim 8, wherein the controller is configured to provide the continuous variable excitation signal to the rotational synchronous motor loads and also selectively provide the pulses of the variable excitation signal to urge synchronous alignment between rotors in each of the plurality of rotational synchronous motor loads and a rotor of the synchronous generator.

10. The system of claim 8, wherein the pulses of the variable excitation signal are selectively applied based on a position of a rotor of the synchronous generator and an average position of a plurality of rotors of the rotational synchronous motor loads.

11. The system of claim 8, wherein the pulses of the variable excitation signal are selectively applied based on a magnitude of apparent power being output by the synchronous generator.

12. The system of claim 8, wherein the pulses of the variable excitation signal are selectively applied at a predetermined cycle and a predetermined accelerating angular difference.

13. The system of claim 8, wherein the pulses are a step change between the continuous variable excitation signal and a magnitude of the pulses of the variable excitation signal.

14. The system of claim 8, wherein the controller is configured to provide the pulses coincident with a predetermined relative position of the synchronous generator and the rotational synchronous motor loads to create a flux linkage between the synchronous generator and the plurality of rotational synchronous motor loads that is maintained by the continuous variable excitation signal.

15. The system of claim 8, wherein the pulses of the variable excitation signal to the synchronous generator represents a step change in torque producing current to a magnitude that produces open circuit flux linkage saturation at the plurality of rotational synchronous motor loads.

16. A method comprising:
controlling, with a controller, an excitation signal to excite a synchronous generator rotatable by an auxiliary rotational machine or a prime mover to output electric power;
directing, with the controller, the auxiliary rotational machine to drive the synchronous generator to rotate at a predetermined relatively low speed;
directing, with the controller, output of a continuous variable level excitation signal and an intermittent pulse of the excitation signal, during rotation of the synchronous generator at the predetermined relatively low speed, the intermittent pulse of the excitation signal output to initiate energized synchronous rotation of a plurality of synchronous motor loads that are initially non-rotational at in response to the output of the continuous variable level excitation signal; and
directing, with the controller, the prime mover to startup and linearly accelerate both the synchronous generator and the plurality of synchronous motor loads from the predetermined relatively low speed toward rated speed of the synchronous generator in response to the plurality of synchronous motor loads achieving energized synchronous rotation of the synchronous motor loads with the synchronous generator at the predetermined relatively low speed.

17. The method of claim 16, wherein a rotor position of at least one of the synchronous motor loads is stationary until the pulse of the excitation signal is provided.

18. The method of claim 16, wherein a rotor position of at least one of the synchronous motor loads is rocking due at least in part to the continuous variable level excitation signal at a time when the pulse of the excitation signal is provided.

19. The method of claim 16, wherein directing, with the controller, provision of the pulse of the excitation signal comprises selectively increasing the continuous variable level excitation signal to a magnitude of the pulse.

20. The method of claim 16, wherein directing, with the controller, provision of the pulse of the excitation signal comprises directing provision of a positive pulse of the excitation signal coincident with a first predetermined relative position of a rotating rotor position of the synchronous generator with respect to a rotor position of the at least one of the synchronous motor loads and directing provision of a negative pulse of the excitation signal coincident with a second predetermined relative position of the rotating rotor position of the synchronous generator with respect to the rotor position of the at least one of the synchronous motor loads.

* * * * *